US012791259B2

(12) United States Patent
Hu et al.

(10) Patent No.: US 12,791,259 B2
(45) Date of Patent: Nov. 10, 2026

(54) HEAT EXCHANGE ASSEMBLY, AND VEHICLE THERMAL MANAGEMENT SYSTEM

(71) Applicant: ZHEJIANG SANHUA AUTOMOTIVE COMPONENTS CO., LTD., Hangzhou (CN)

(72) Inventors: Meiyan Hu, Hangzhou (CN); Bin Song, Hangzhou (CN); Linzhong Wu, Hangzhou (CN); Yunpeng Wang, Hangzhou (CN); Zhengyi Yin, Hangzhou (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 613 days.

(21) Appl. No.: 18/010,026

(22) PCT Filed: Jul. 23, 2021

(86) PCT No.: PCT/CN2021/108079
§ 371 (c)(1),
(2) Date: Dec. 13, 2022

(87) PCT Pub. No.: WO2022/022410
PCT Pub. Date: Feb. 3, 2022

(65) Prior Publication Data
US 2023/0226878 A1 Jul. 20, 2023

(30) Foreign Application Priority Data
Jul. 25, 2020 (CN) ......................... 202010726730.5

(51) Int. Cl.
*F28D 9/00* (2006.01)
*B60H 1/00* (2006.01)
(Continued)

(52) U.S. Cl.
CPC ....... *F28D 9/0093* (2013.01); *B60H 1/00328* (2013.01); *B60H 1/00342* (2013.01);
(Continued)

(58) Field of Classification Search
CPC ... F28D 9/0037; F28D 9/0093; F28F 2250/08
See application file for complete search history.

(56) References Cited

U.S. PATENT DOCUMENTS 7,469,554 B2 * 12/2008 Martins .................. F28D 9/005 62/506
9,109,840 B2 * 8/2015 Kadle ................ B60H 1/32284
(Continued)

FOREIGN PATENT DOCUMENTS

CN 102639953 A 8/2012
CN 105066750 A 11/2015
(Continued)

OTHER PUBLICATIONS

Translation of WO2018086553A1 named WO2018086553A1 (Year: 2018).*
(Continued)

*Primary Examiner* — Paul Alvare
(74) *Attorney, Agent, or Firm* — Ohlandt, Greeley and Perle, L.L.P.

(57) ABSTRACT

A heat exchange assembly and a vehicle thermal management system. The heat exchange assembly includes first heat exchange part, bridging member, second heat exchange part and connecting member. The first heat exchange part, the bridging member and the second heat exchange part are fixed by welding. The heat exchange assembly includes six ports. The connecting member is provided with at least three ports. The bridging member includes two holes and/or grooves, which face towards the first heat exchange part and are used for communication with same, and the bridging
(Continued)

member includes at least two holes and/or grooves for being in communication with the second heat exchange part. Openings, of the holes and/or grooves capable of being in communication with the second heat exchange part of the bridging member, face towards the second heat exchange part.

20 Claims, 27 Drawing Sheets

(51) Int. Cl.

| | |
|---|---|
| ***B60H 1/32*** | (2006.01) |
| ***B60K 11/02*** | (2006.01) |
| ***B60L 58/26*** | (2019.01) |
| ***F28F 3/08*** | (2006.01) |
| ***F28F 9/02*** | (2006.01) |
| ***F28F 9/26*** | (2006.01) |
| ***F28F 13/06*** | (2006.01) |
| ***F28F 27/02*** | (2006.01) |
| ***H01M 10/613*** | (2014.01) |
| ***H01M 10/625*** | (2014.01) |
| ***H01M 10/655*** | (2014.01) |
| ***H01M 10/6567*** | (2014.01) |
| *B60K 1/00* | (2006.01) |
| *F25B 39/02* | (2006.01) |
| *F28D 21/00* | (2006.01) |

(52) U.S. Cl.

CPC ............ *B60H 1/3229* (2013.01); *B60L 58/26* (2019.02); *F28D 9/0037* (2013.01); *F28D 9/005* (2013.01); *F28D 9/0075* (2013.01); *F28F 3/086* (2013.01); *F28F 9/0253* (2013.01); *F28F 9/26* (2013.01); *F28F 13/06* (2013.01); *F28F 27/02* (2013.01); *H01M 10/613* (2015.04); *H01M 10/625* (2015.04); *H01M 10/655* (2015.04); *H01M 10/6567* (2015.04); *B60H 1/3227* (2013.01); *B60K 1/00* (2013.01); *B60K 2001/005* (2013.01); *B60K 11/02* (2013.01); *F25B 39/022* (2013.01); *F28D 2021/0084* (2013.01); *F28D 2021/0085* (2013.01); *Y02E 60/10* (2013.01); *Y02T 10/70* (2013.01)

(56) References Cited

U.S. PATENT DOCUMENTS

| | | | | |
|---|---|---|---|---|
| 9,239,193 | B2 * | 1/2016 | Kadle | F28B 9/005 |
| 10,066,878 | B2 * | 9/2018 | Huang | F25B 40/00 |
| 11,492,953 | B1 * | 11/2022 | Chen | F01P 3/18 |
| 2012/0060550 | A1 * | 3/2012 | Mann | F25B 39/00 62/513 |
| 2012/0210746 | A1 * | 8/2012 | Kadle | B60H 1/32284 165/166 |
| 2012/0216562 | A1 * | 8/2012 | Kadle | F28D 9/0093 62/434 |
| 2012/0222846 | A1 * | 9/2012 | Kadle | B60H 1/00342 165/166 |
| 2012/0234523 | A1 | 9/2012 | Jouanny et al. | |
| 2016/0160813 | A1 * | 6/2016 | Amaral | F02M 31/102 123/557 |
| 2017/0122669 | A1 | 5/2017 | Takahashi | |
| 2018/0080693 | A1 * | 3/2018 | Wang | H01M 10/625 |
| 2018/0163586 | A1 | 6/2018 | Schmidgall | |
| 2018/0231324 | A1 * | 8/2018 | Fetzer | F28F 3/08 |
| 2019/0063800 | A1 * | 2/2019 | Rhee | F25B 39/00 |
| 2020/0031198 | A1 * | 1/2020 | Chen | B60H 1/00278 |
| 2021/0283992 | A1 * | 9/2021 | Rhee | F28F 9/0246 |
| 2021/0325131 | A1 * | 10/2021 | Tonellato | F28D 9/005 |
| 2022/0233999 | A1 * | 7/2022 | Hakenbeck | B01D 5/009 |

FOREIGN PATENT DOCUMENTS

| | | | | | |
|---|---|---|---|---|---|
| CN | 108066572 | A | | 5/2018 | |
| CN | 108068576 | A | | 5/2018 | |
| CN | 20190023263 | A | | 3/2019 | |
| CN | 110044200 | A | | 7/2019 | |
| CN | 209485114 | U | | 10/2019 | |
| CN | 110411247 | A | | 11/2019 | |
| EP | 3540352 | A1 | | 9/2019 | |
| JP | 2013-506809 | A | | 2/2013 | |
| JP | 3193595 | U | | 10/2014 | |
| JP | 2016001099 | A | | 1/2016 | |
| JP | 2019-533797 | A | | 11/2019 | |
| KR | 20190046989 | A | | 5/2019 | |
| WO | WO-2010108907 | A1 | * | 9/2010 | B60H 1/00342 |
| WO | WO-2014048219 | A1 | * | 4/2014 | B23P 15/26 |
| WO | WO-2018086553 | A1 | * | 5/2018 | F28F 27/02 |
| WO | WO-2022218278 | A1 | * | 10/2022 | B60H 1/00485 |

OTHER PUBLICATIONS

Korean Office Action dated Nov. 20, 2024 for Korean Application No. 10-2022-7046433.

Japanese Office Action dated Feb. 6, 2024 for Japanese Appl. No. 2023-502751.

International Search Report dated Oct. 21, 2021 for PCT Appl. No. PCT/CN2021/108079.

Japanese Office Action (with English translation) dated Feb. 25, 2025 for Japanese Patent Application No. 2023-502751.

* cited by examiner

HEAT EXCHANGE ASSEMBLY, AND VEHICLE THERMAL MANAGEMENT SYSTEM

This disclosure is a national phase application of PCT international patent application PCT/CN2021/108079, filed on Jul. 23, 2021 which claims priority of Chinese Patent Disclosure No. 202010726730.5, titled "HEAT EXCHANGE ASSEMBLY, AND VEHICLE THERMAL MANAGEMENT SYSTEM", filed with the China National Intellectual Property Administration on Jul. 25, 2020, both of which are incorporated herein by reference in their entireties.

BACKGROUND

1. Field of the Disclosure

The present disclosure relates to the field of fluid control, and in particular to a heat exchange assembly, and a vehicle thermal management system.

2. Discussion of the Background Art

Some thermal management systems include no less than two heat exchangers, such as plate evaporators. These heat exchangers and components are generally connected by pipelines and fixed in the system. In addition, due to the large number of components in the system, the connection of pipelines in the system is relatively complex.

SUMMARY

To provide a heat exchange assembly with relatively simple connection during system connection, the following technical solution is provided according to the present disclosure:

a heat exchange assembly includes a first heat exchange part, a bridging member, a second heat exchange part and a connecting piece, where the bridging member is at least partially located between the first heat exchange part and the second heat exchange part, the first heat exchange part, the bridging member and the second heat exchange part are fixed by welding; the second heat exchange part is at least partially located between the bridging member and the connecting piece; the first heat exchange part has a heat exchange core body, the first heat exchange part includes at least two fluid flow passages, which are not in communication with each other;

the heat exchange assembly includes at least six ports: a first port, a second port, a third port, a fourth port, a fifth port and a sixth port. The connecting piece has the fourth port, the fifth port and the sixth port; the second heat exchange part includes four ducts: a first duct, a second duct, a third duct and a fourth duct; the fourth port is in communication with the first duct of the second heat exchange part, and the fifth port is in communication with the fourth duct of the second heat exchange part; the sixth port in communication with the fourth port through the second heat exchange part or through a flow passage; the first heat exchange part includes two ducts: a first duct, a second duct, the first duct of the first heat exchange part is in communication with the first duct of the second heat exchange part through the bridging member; the bridging member includes two holes and/or grooves facing the first heat exchange part for communication. Moreover, the bridging member includes at least two holes and/or grooves in communication with the second heat exchange part. The openings of the holes and/or grooves of the bridging member that is capable of being in communication with the second heat exchange part face the second heat exchange part.

A vehicle thermal management system is further provided according to the present disclosure, which includes a refrigerant flow passage and a coolant flow passage, and further includes the heat exchange assembly as described above; the vehicle thermal management system includes a compressor, a condenser and at least one evaporator, the coolant flow passage flows through the first port part, the second port part and a flow passage part of the first heat exchange part, which is in communication with the first port and the second port, the condenser is connected with the third port part through a pipeline or through a pipeline and a liquid reservoir, an inlet of the compressor is in communication with the fourth port, an inlet of the evaporator is in communication with the fifth port, or the vehicle thermal management system further includes a throttle element between the inlet of the evaporator and the fifth port, and an outlet of the evaporator is in communication with the sixth port.

The flow passage herein includes the following types: the flow passage of a single component and the flow passage formed by the combination of two or more components (e.g., the sixth port is in communication with the fourth port through a flow passage); the flow passage passing through the connecting piece itself; the flow passage formed by the space where the groove of the connecting piece faces the second heat exchange part after the connecting piece is fixed with the second heat exchange part; the flow passage formed by the concave space of the second heat exchange part after the connecting piece is fixed with the second heat exchange part; and even the flow passage formed by the combination of the connecting piece and the second heat exchange part and other components, etc. The holes and/or grooves facing the first heat exchange part for communication include various modes: holes for communication, grooves for communication, combination of holes and grooves, combination of holes and holes, combination of grooves and grooves and more; the same applies to the holes and/or grooves in communication with the second heat exchange part: it may be that the hole in communication with the second heat exchange part, the groove in communication with the second heat exchange part, or both the hole and the groove in communication with the second heat exchange part. The communication here also includes direct communication and indirect communication. The bridging member includes two holes or grooves for communication towards or close to the first heat exchange part. The bridging member includes at least two holes and/or grooves capable of being in communication with the second heat exchange part. The hole or groove facing or close to the first heat exchange part for communication are not excluded for being in communication with the second heat exchange part. If the holes or grooves are in the form of through hole, they can both face the first heat exchange part, or they can face the second heat exchange part and in communication with the second heat exchange part. The communication between the two heat exchange parts through a pipeline or something is not an excluded description in this specification, which means that the two parts are in communication and can further include other components provided between the two heat exchange parts, such as throttling elements, separators, control valves, check valves, heat exchangers, and the like.

The fluid communication between two heat exchange parts can be realized relatively conveniently through the bridging member, and multiple ports are arranged through the connecting piece, so that the system connection is simple and convenient. Different system requirements can be realized by changing the structure of the bridging member and the structure of the connecting piece, which can be applied to a variety of systems, so that the pipeline of the system is simple, and the pipelines between the ports can be reduced.

DETAILED DESCRIPTION OF THE EMBODIMENTS

Figure 1:
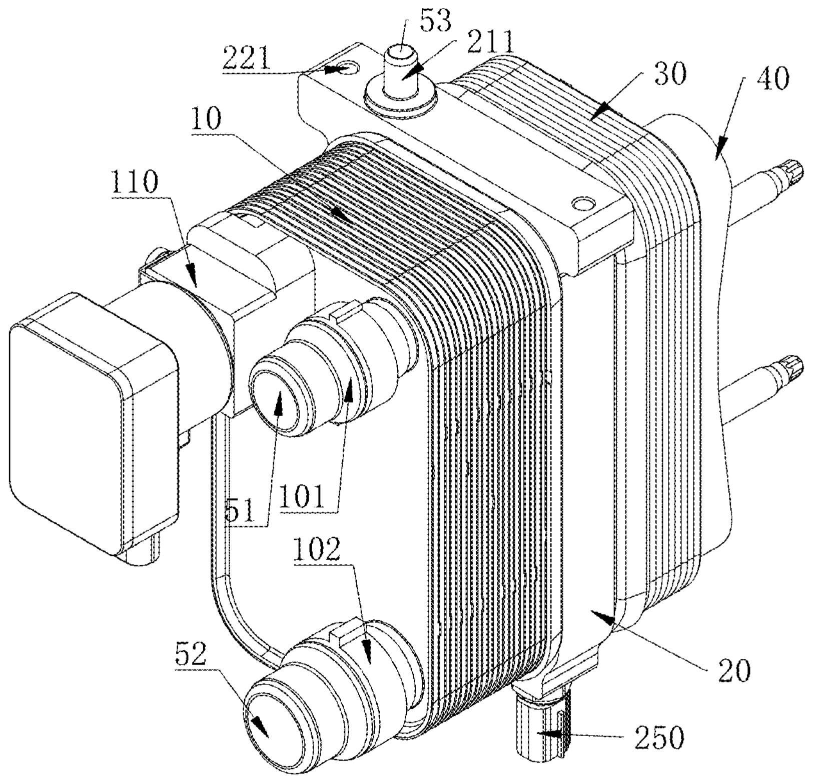
FIG. 1 and FIG. 2 are schematic perspective views of the first embodiment of the heat exchange assembly provided by the present disclosure in two directions.
Figure 2:
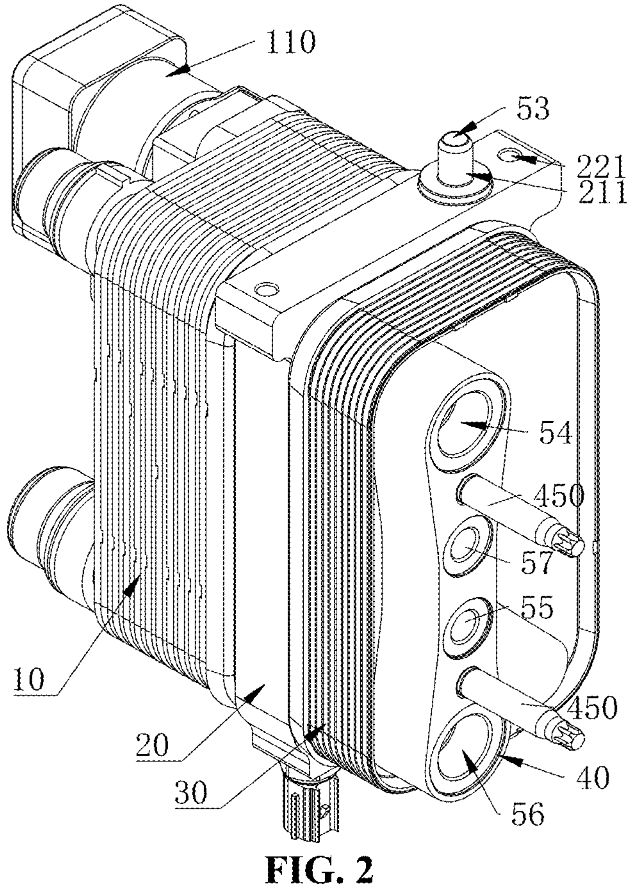
Figure 3:
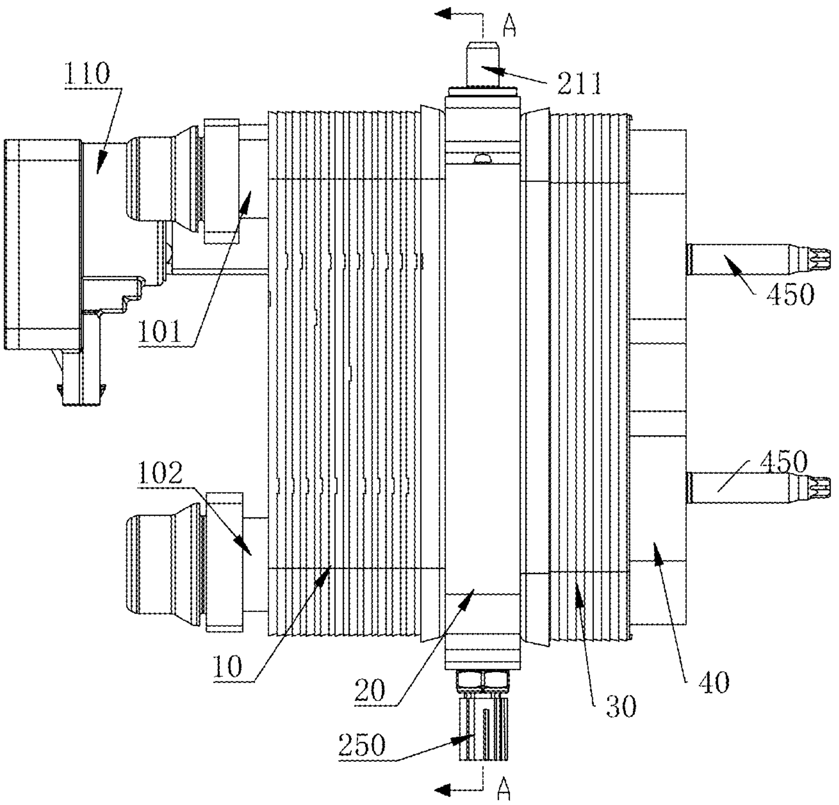
FIG. 3 is a schematic view from the front view of the heat exchange assembly shown in FIG. 1.
Figure 4:
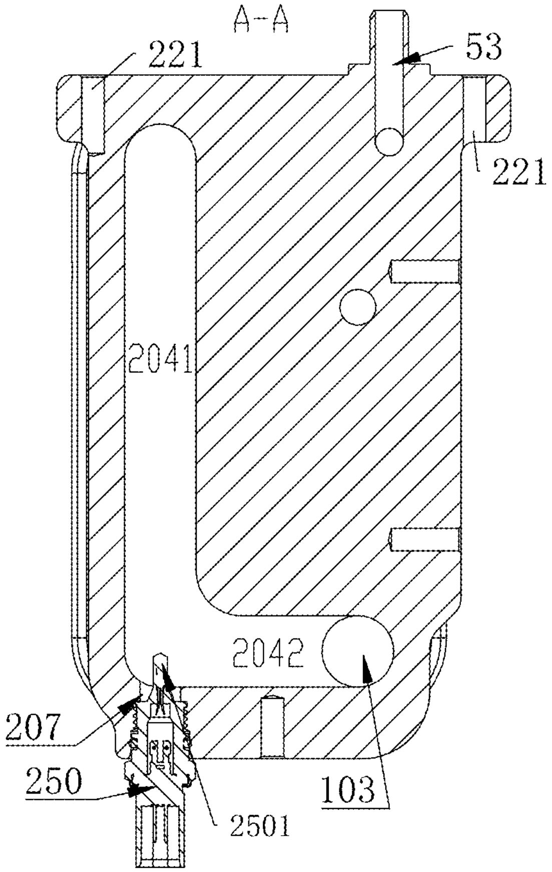
FIG. 4 is the schematic diagram of the A-A direction sectional view of the assembly shown in FIG. 3.
Figure 5:
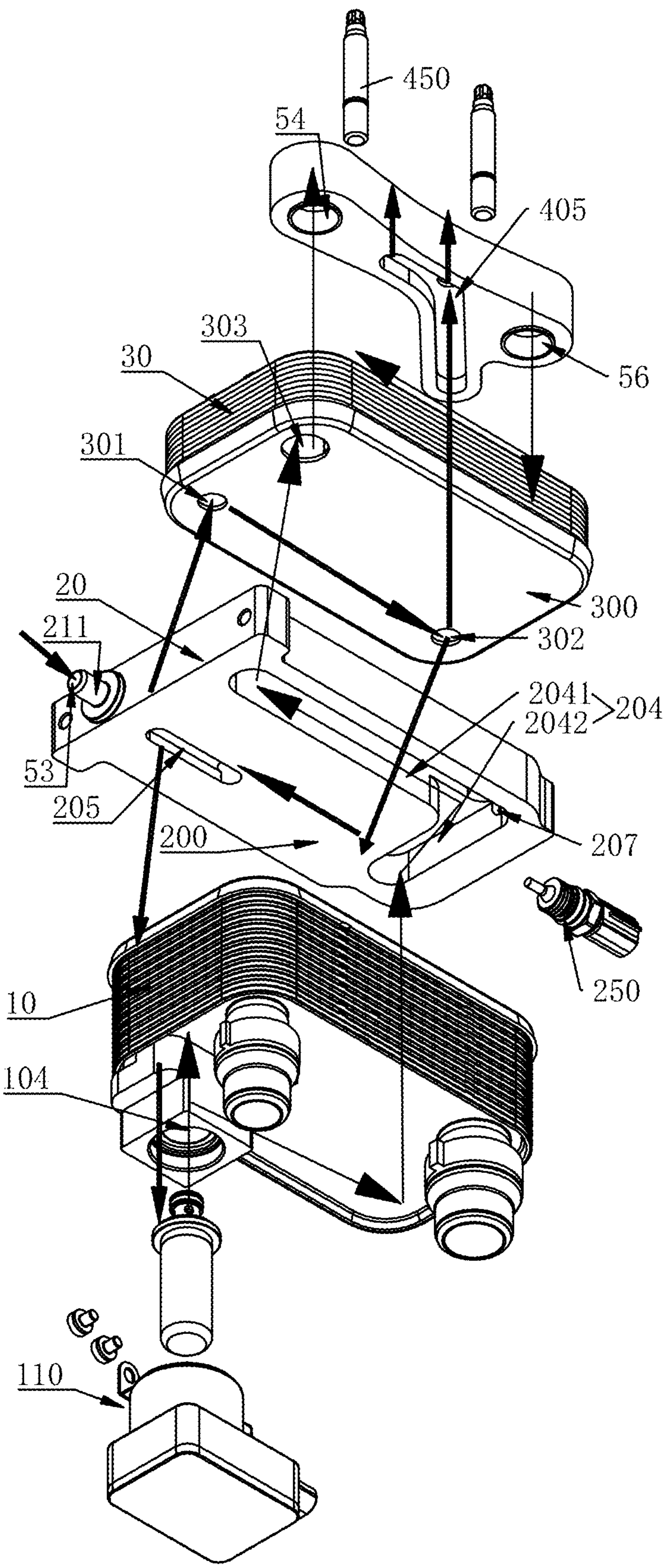
FIG. 5 is an exploded schematic diagram of the heat exchange assembly.
Figure 6:
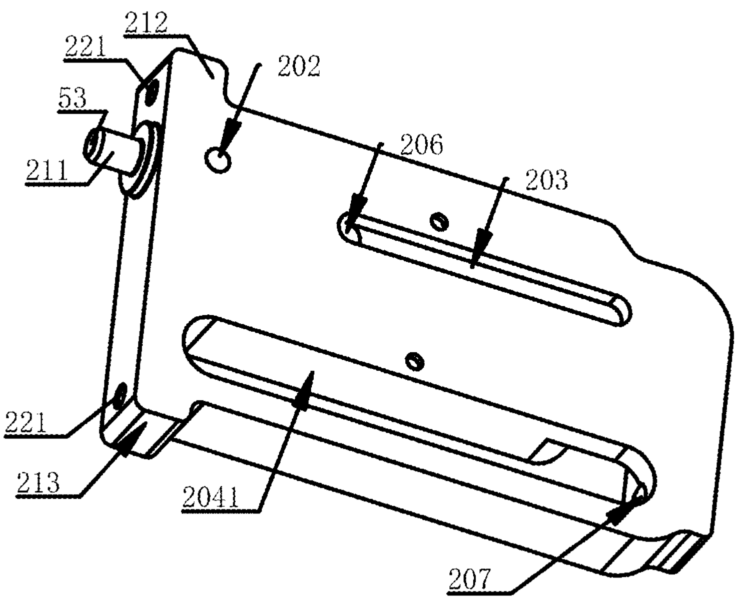
FIG. 6 is a perspective view of a bridging member of the heat exchange assembly.
Figure 7:
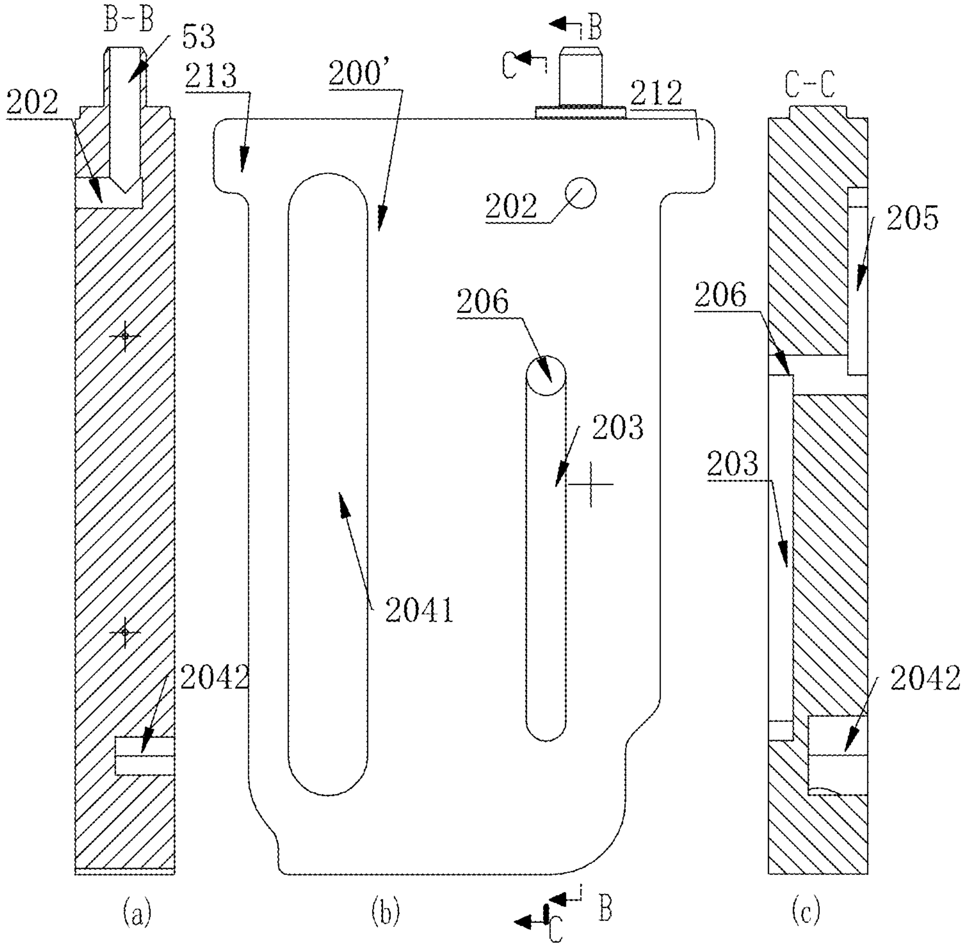
FIG. 7 is a front view of the bridging member shown in FIG. 6 and a schematic diagram of a cross-sectional view of the bridging member along the B-B direction and the C-C direction.
Figure 8:
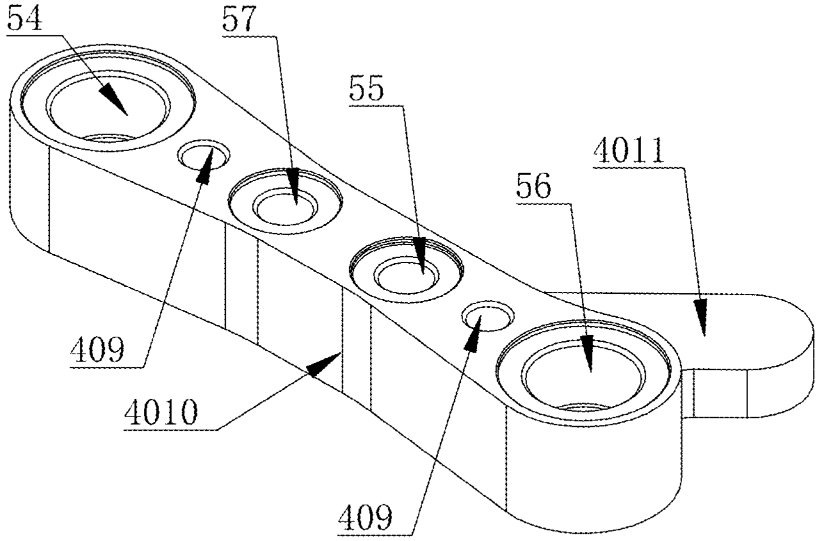
FIG. 8 and FIG. 9 are the three-dimensional schematic diagrams of the connecting piece of the heat exchange assembly in two directions.
Figure 9:
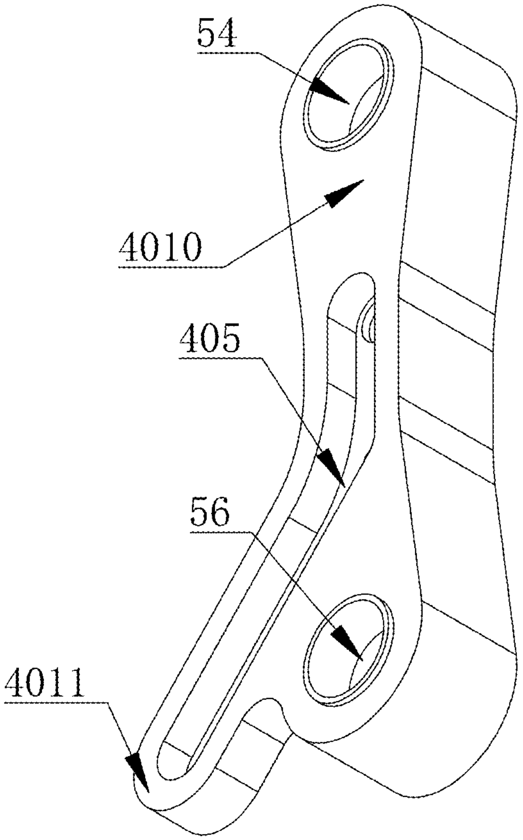

The technical solution is described below in conjunction with specific embodiments, as shown in FIG. 1 to FIG. 9, FIG. 1 and FIG. 2 are schematic perspective views of the first embodiment of the heat exchange assembly provided by the present disclosure in two directions, FIG. 3 is a schematic diagram of the front view direction of the heat exchange assembly, FIG. 4 is the schematic diagram of the A-A direction sectional view of the assembly shown in FIG. 3, FIG. 5 is an exploded schematic diagram of the heat exchange assembly, FIG. 6 is a perspective view of a bridging member of the heat exchange assembly, FIG. 7 is a front view of the bridging member shown in FIG. 6 and a schematic diagram of a cross-sectional view of the bridging member along the B-B direction and the C-C direction, FIG. 8 and FIG. 9 are the three-dimensional schematic diagrams of the connecting piece of the heat exchange assembly in the two directions. As shown in Figures, the heat exchange assembly includes a first heat exchange part 10, a throttle element 110, a bridging member 20, a second heat exchange part 30, and a connecting piece 40. The bridging member 20 is located between the first heat exchange part 10 and the second heat exchange part 30, and the connecting piece 40 is located on the other side of the second heat exchange part 30. That is, the bridging member 20 and the connecting piece 40 are arranged on both sides of the second heat exchange part, respectively. The first heat exchange part 10, the bridging member 20 and the second heat exchange part 30 are fixed by welding. Alternatively, the first heat exchange part 10, the bridging member 20, the second heat exchange part 30 and the connecting piece are fixed by welding.

The first heat exchange part 10 has a heat exchange core body and two flow passages through which fluid flows for heat exchange, and the two fluid flow passages are separated from each other. The first heat exchange part 10 includes interlayer flow passages separated by stacks of plates. At least two fluids can flow through the first heat exchange part 10, the two fluids can exchange heat in the first heat exchange part, for example, one fluid is a refrigerant, and the other fluid may be a coolant for cooling heating elements such as batteries. In addition, the heat exchange part can also be used for three fluids, for example, one fluid is refrigerant, the other two fluids can be coolant. The two coolants can be controlled to selectively exchange heat with the refrigerant, and then are used to cool the components that need to be cooled after heat exchange and temperature reduction. The following description is given by taking two fluids flowing through the first heat exchange part as an example.

The heat exchange assembly has a first port 51, a second port 52, a third port 53, a fourth port 54, a fifth port 55, a sixth port 56, and a seventh port 57. In this embodiment, the first heat exchanger is provided with the first port 51 and the second port 52. The bridging member 20 is provided with the third port 53. The connecting piece 40 is provided with the fourth port 54, the fifth port 55, the sixth port 56, and the seventh port 57. The throttle element 110 and the first heat exchange part 10 are fixedly arranged or arranged in position-limitation manner. The first heat exchange part 10 has four ducts such as a first duct 103 and a second duct 104 (not all shown in Figures). In the duct 104, the first heat exchange part is further provided with a pipe having a communication port 105, and the communication port 105 is in communication with the throttle element 110. The first heat exchange part 10 includes a first port part 101 and a second port part 102. The first port part 101 has a first port 51 for communication with the coolant. The second port part 102 has a second port 52 for communication with the coolant. The first port 51 is in communication with the second port 52 through the flow passage of the heat exchange core body. The first port part 101 and the second port part 102 may be a part of the side plate of the first heat exchange part. Alternatively, the first port part 101 and the second port part 102 may be processed separately and fixed to the side plate and/or the heat exchange core body of the first heat exchange part by welding. The first port part and the second port part may also be fixed together with the first heat exchange part in the form of pipe joints.

The bridging member 20 has a first matching part 200 and a second matching part 200'. Accordingly, the first heat exchange part 10 has a matching part 100, and the matching part 100 is correspondingly matched with the first matching part 200 of the bridging member. The second heat exchange part 30 has a matching part 300, and the matching part 300 is correspondingly matched with the second matching part 200' of the bridging member; the matching part 100 of the first heat exchange part 10, the matching part 300 of the second heat exchange part 30, and the two matching parts of the bridging member all include flat parts. Openings of a hole, a groove for communication or a guide part of the bridging member, which are provided at the first matching part 200, are all arranged inside the first matching part. In addition, the periphery of each communication opening is surrounded by the first matching part. The first heat exchange part has a corresponding communication opening at a position corresponding to each opening of the bridging member for communication. Each communication opening of the first heat exchange part is located inside the matching part thereof, and each communication opening is surrounded by the matching part. In this way, after the matching part 100 of the first heat exchange part 10 and the first matching part 200 of the bridging member are welded and sealed, the communication opening of the bridging member can be in communicating with the corresponding communication opening of the first heat exchange part. In other words, the periphery of each communication opening is a part of the matching part. The two communication openings form a substantially closed structure at the oppositely arranged matching parts. The matching part 300 of the second heat exchange part 30 corresponds to the position of the second matching part 200' of the bridging member. After the second heat exchange part is welded and sealed with the bridging member, the communication openings of the bridging member on this side are all in communication with the communication openings of the second heat exchange part. Specifically, the second heat exchange part 30 has the openings of three ducts on the side opposite to the bridging member 20: the openings of the third duct 301, the fourth duct 302, and the first duct 303, the bridging member 20 has the opening of the guide hole 202, the opening of the first groove 203 and the opening of the hole 2041 of the guide part 204 on the side opposite to the second heat exchange part 30, i.e., the second matching part. The opening of the third duct 301 of the second heat exchange part corresponds to the opening of the guide hole 202, the opening of the fourth duct 302 corresponds to the position of the opening of the first groove 203, the position of the opening of the first duct 303 corresponds to the position of the opening of the hole 2041 of the guide part 204. The opening of the hole 2041 is generally arranged to extend upward and downward, and the opening of the first groove 203 is generally arranged to extend upward and downward.

In this specification, the directional word such as upward and downward is for the purpose of clarification, and should not be regarded as limitation. Here, it corresponds to the height direction. The holes herein include but are not limited to through holes and blind holes. The shape of the hole may be circular or non-circular; generally, the groove is a non-penetrating groove, but it also includes the situation that most parts of the groove do not penetrate, but some parts do.

The bridging member 20 further includes a third port part 211, and the third port part 211 has a third port 53. The third port part 211 includes an outwardly protruding structure. The third port part 211 may be a structure integrated with the main body of the bridging member, or may be a structure that is processed separately and fixed to the main body of the bridging member by welding. In addition, the bridging member 20 is provided with a through hole 206, and the first groove 203 is a blind hole-like structure extending upward and downward. A through hole 206 is provided on the side of the first groove 203 relatively close to the third port part; a second groove 205 is arranged on the side of the bridging member where the first matching part is located. The second groove 205 is a blind hole-like structure extending upward and downward. The through hole 206 is located on the side of the second groove 205 relatively far away from the third port part; the first groove 203 is in communication with the second groove 205 through the through hole 206. In other words, the through hole 206 or a part of the through hole 206 is extended at one end of the first groove 203, and the through hole 206 or another part of the through hole 206 is extended at one end of the second groove 205, as shown in FIG. 7. The guide hole 202 is a blind hole-like structure, the opening of the guide hole 202 is on the side of the second matching part, and the guide hole 202 is in communication with the third port 53. A depth of the guide hole is greater than or equal to a half thickness of the bridging member. Or the depth of the guide hole is nearly a half thickness of the bridging member. For example, the depth of the guide hole is greater than or equal to one-third of the thickness of the bridging member and less than two-thirds of the thickness of the bridging member. The guide part 204 includes a hole 2041 and a groove 2042. The hole 2041 is substantial a through hole, and the groove 2042 is substantial a blind hole. The opening of the groove 2042 is disposed on the side where the first matching part is located. In this specification, the side of the bridging member facing the first heat exchange part is defined as the front side, and the side of the bridging member facing the second heat exchange part is defined as the back side. In this embodiment, the side where the first groove 203 is set is the back side of the bridging member, and the side where the second groove 205 is set is the front side of the bridging member. A projection of the first groove 203 on the front side is at least partially located in the groove 2042 of the guide part. A projection of the guide hole 202 on the front side is at least partially located in the second groove 205. That is, the guide hole 202 is at least partially back to the second groove 205 and is not in direct communication. The first groove 203 is at least partially back to the groove 2042 and is not in direct communication.

The connecting piece 40 includes a main body part 4010 and an extension part 4011. The connecting piece 40 is provided with a fourth port 54, a fifth port 55, a sixth port 56, a seventh port 57, and is further provided with a fixing hole 409 for matching, fixing or position limiting. The connecting piece 40 has a groove 405 on the side facing the second heat exchange part 30, and the groove 405 is substantial a blind hole-like structure. A seventh port 57 is provided at the groove 405 relatively close to the fourth port 54, and a fifth port 55 is provided at a substantially middle position of the groove 405. Both the fifth port 55 and the seventh port 57 are in communication with the groove 405. The connecting piece may further include a fixing element 450 for fixing or position limiting. The fixing element 450 may be fixed or position limited to the fixing hole 409.

The heat exchange assembly can facilitate the installation and connection of the thermal management system, reduce the number of connected pipes, and reduce the volume of the system. Taking the heat exchange assembly for a vehicle thermal management system as an example, it should be noted that the components of the heat exchange assembly are fixed in actual use. For the sake of clarity, the flow of the refrigerant is shown in the exploded view, which is only for clarity and explanation. A specific vehicle thermal management system includes a refrigerant system and a battery thermal management system. Referring to FIG. 5 and other views, the battery thermal management system includes a first port part 101, a second port part 102 of the heat exchange assembly, and a flow passage part in the first heat exchange part that is in communication with the first port and the second port. The heat of the battery can be transferred to the coolant, and the heat flows through the flow passage of the first heat exchange part through the first port 51 or the second port 52, and exchanges heat with the refrigerant of another passage in the first heat exchange part. After being cooled down, the coolant is flowing back to cool the battery. The third port 53, the fourth port 54, the fifth port 55, the sixth port 56, and the seventh port 57 are used to be in communicating with the refrigerant system, respectively. For example, the refrigerant cooled by the condenser enters the heat exchange assembly through the third port 53, or the refrigerant flowing through the reservoir enters the heat exchange assembly through the third port 53. In this way, the high-temperature and high-pressure refrigerant passes through the guide hole 202 to the third duct 301 of the second heat exchange part, and exchanges heat with the refrigerant of another passage in the second heat exchange part 30, then flows to the fourth duct 302. The refrigerant through the fourth duct 302 is divided into two parts: one part of the refrigerant flows through the flow passage formed by the space where the groove 405 is located and by cooperation of the connecting piece 40 and the second heat exchange part, and then flows out through the fifth port 55 and the seventh port 57, for example, to the front evaporator through the fifth port 55 and to the rear evaporator through the seventh port 57, or to the rear evaporator through the fifth port 55 and to the front evaporator through the seventh port 57. A throttle element may also be set before the front evaporator or the rear evaporator. The other part of the refrigerant enters the throttle element 110 in the following sequence: a flow passage formed by the space where the first groove 203 is located and by cooperation of the bridging member and the matching part of the second heat exchange part; a through hole 206; a flow passage formed by the space where the second groove 205 is located and by cooperation of the bridging member and the matching part of the first heat exchange part; and a communication port in communication with the throttle element. After being throttled by the throttle element 110, this other part of refrigerant enters the duct of the first heat exchange part 10 and exchanges heat with the coolant in the coolant passage of the first heat exchange part in the refrigerant passage, and then flows to the first duct 103, and passes through the flow passage formed by the guide part 204 and cooperated with the bridging member, the first heat exchange part and the second heat exchange part, and flows to the first duct 303 of the second heat exchange part, and finally flows out through the fourth port in communication with the first duct 303, and, for example, flows back the compressor. In addition, the sixth port 56 can be used to be in communication with the refrigerant flowing back from the front evaporator and/or the rear evaporator. The low-temperature refrigerant flows to the first duct 303 through the second duct 304 of the second heat exchange part, and exchanges heat with the high-temperature refrigerant flowing from the third duct 301 to the fourth duct 302. In the first duct 303, the two parts of the refrigerant may flow back to the compressor through the fourth port after being merged. In this way, part of the low-temperature refrigerant is used to cool the high-temperature refrigerant, which may reduce the condensing temperature of the refrigerant without increasing the temperature of the refrigerant back to the compressor. The flow direction in this specification is only for illustration, not for restriction or excluded requirement, and other components can be added in the flow path, such as adding other control valves before the compressor. A second mounting part 207 is further provided on the bridging member 20 for mounting the sensing element 250, for example, the temperature sensing element. During the mounting of the temperature sensing element, the temperature sensing head 2501 passes through the mounting part and is located in the flow passage where the guide part 204 is located. In this way, the temperature of the refrigerant after passing through the first heat exchange part or the outlet temperature of the evaporator can be obtained.

Figure 10:
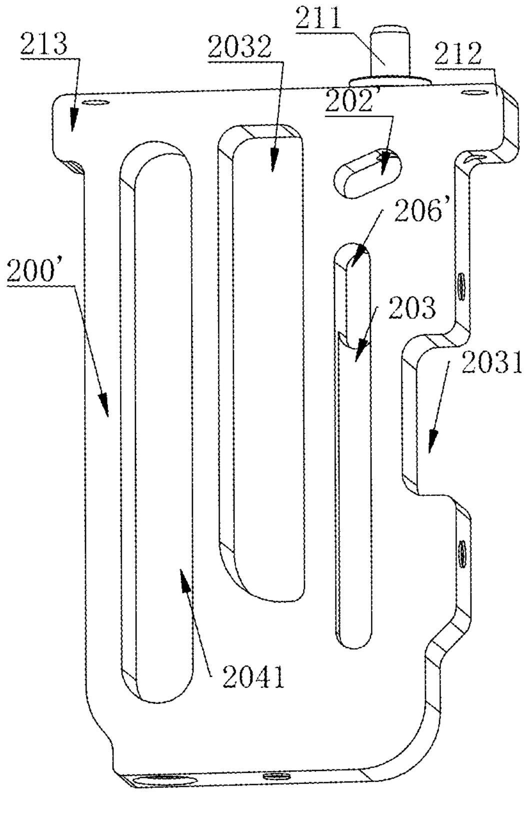
FIG. 10 and FIG. 11 are schematic perspective views of another embodiment of the bridging member of the above heat exchange assembly.
Figure 11:
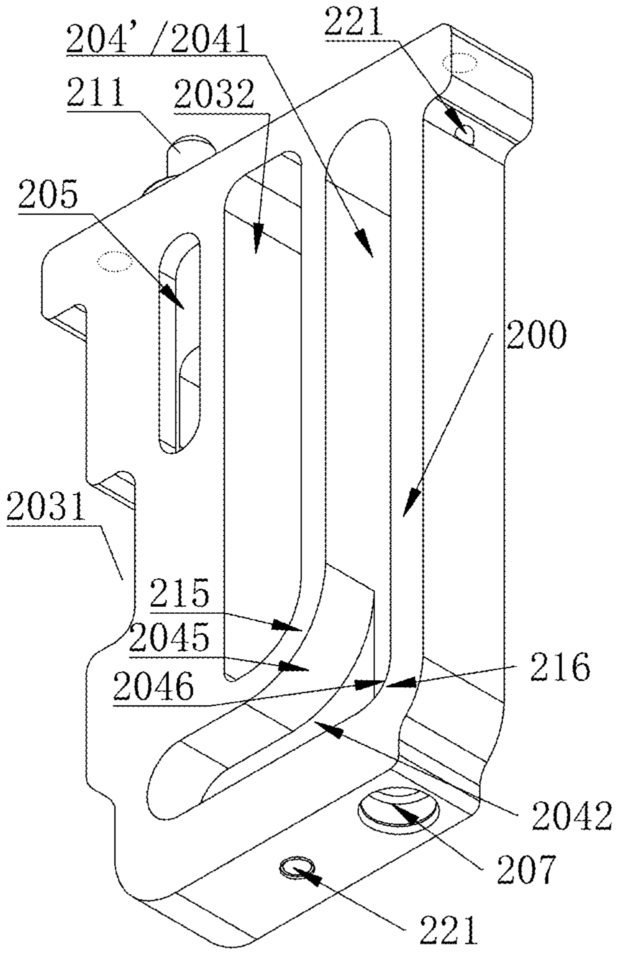

The heat exchange assembly may realize heat exchange between high-temperature refrigerant and part of low-temperature refrigerant, reduce the temperature of the high-temperature refrigerant, and prevent the temperature of the refrigerant back to the compressor from being too high, thereby improving the efficiency. In addition, the pipelines can be reduced between the ports, and the system connection is simple and convenient. In addition, in order to further reduce the weight, the bridging member may also be as shown in FIG. 10 and FIG. 11, which is improved based on the above embodiment, and a piece is removed in the middle of the bridging member to form a weight-reducing hole 2032. The weight-reducing hole penetrates from the side of the bridging member close to the first heat exchange part to the side of the bridging member close to the second heat exchange part. The shape of the hole 2032 may be non-standard and may be changed according to the needs of welding. The weight-reducing hole may generally be a through hole. The distance between the hole 2032 and the second groove 205 of the bridging member facing the first heat exchange part for communication is greater than or equal to 1.5 mm. The distance between the weight-reducing hole 2032 and the guide part 204 of the bridging member facing the first heat exchange part for communication is greater than or equal to 1.5 mm; the distance between the weight-reducing hole 2032 and the hole 202' of the bridging member facing the second heat exchange part for communication is greater than or equal to 1.5 mm, and the hole 202' is a guide hole. The distance between the weight-reducing hole 2032 and the first groove 203 of the bridging member facing the second heat exchange part for communication is greater than or equal to 1.5 mm. The distance between the weight-reducing hole 2032 and the hole 2041 for communication facing the second heat exchange part of the bridging member is greater than or equal to 1.5 mm. In other words, this distance is the distance between the matching parts of the bridging members used to cooperate with the first heat exchange part and the second heat exchange part respectively, and the matching parts are used for welding. In addition, a piece is removed at one side of the bridging member to form a concave part, namely a notch 2031. In this way, the area of the first matching part of the bridging member for matching with the first heat exchange part can be reduced, and the area of the second matching part of the bridging member for matching with the second heat exchange part can also be reduced. Therefore, the welding area of the matching parts can be reduced, which is helpful to improve the welding quality, and reduce the weight. At the intersection of the hole 2041 and the groove 2042, the bridging member has a first wall 215 and a second wall 216. A surface of the first wall 215 facing the guide part forms a first wall surface 2045 with a smooth transition. A surface of the second wall 216 facing the guide part forms a second wall surface 2046 with a smooth transition. For the flow passage formed by the guide part 204' and cooperated with the bridging member, the first heat exchange part and the second heat exchange part, the flow resistance of the refrigerant during turning can be reduced with the configuration of this smooth transition part. The non-circular guide hole 202' is slightly lateral extended, which facilitates of being cooperated with the flowing of refrigerant.

Figure 12:
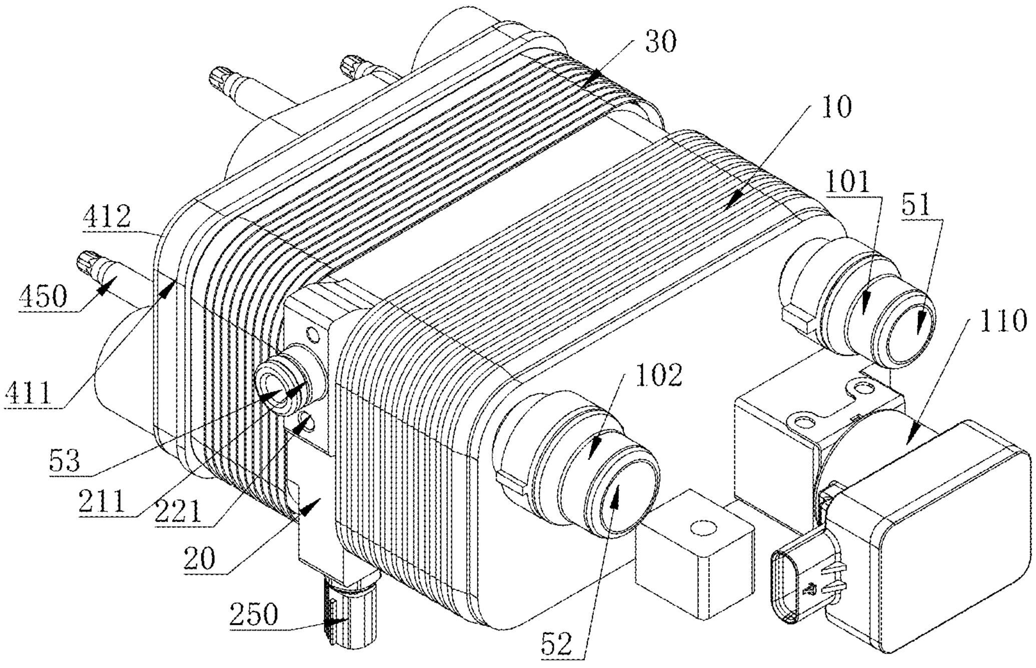
FIG. 12 and FIG. 13 are schematic perspective views of the second embodiment of the heat exchange assembly in two directions.
Figure 13:
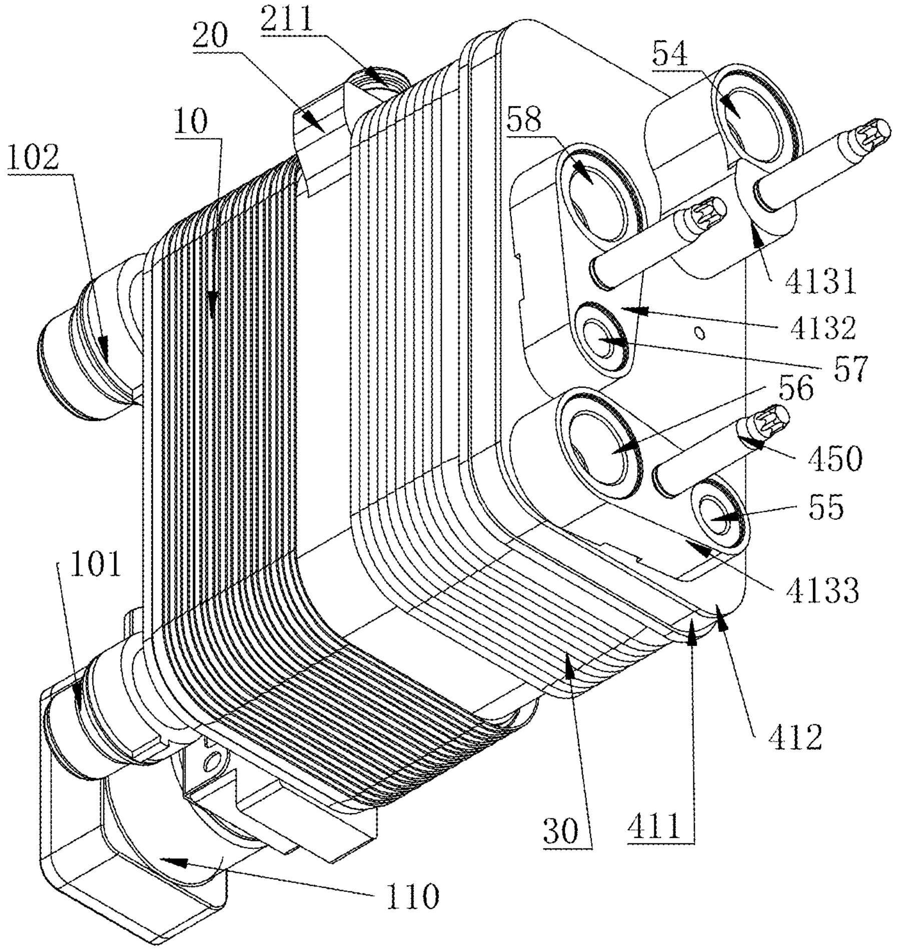
Figure 14:
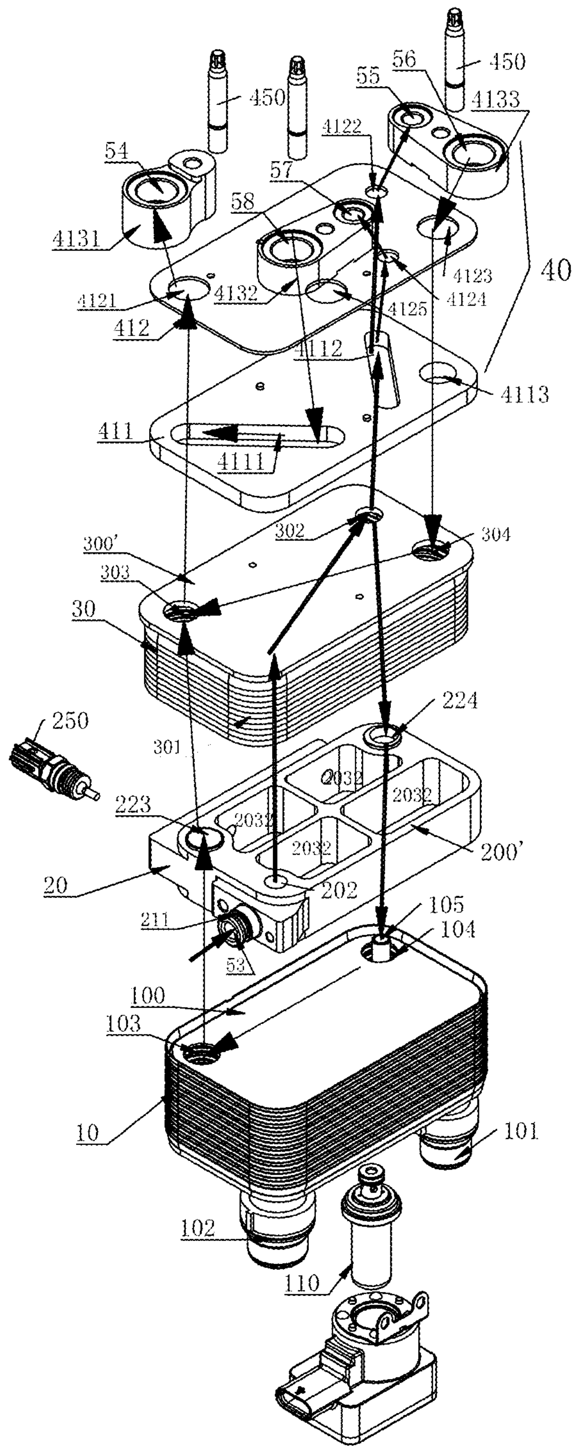
FIG. 14 is an exploded schematic diagram of the heat exchange assembly shown in FIG. 12.
Figure 15:
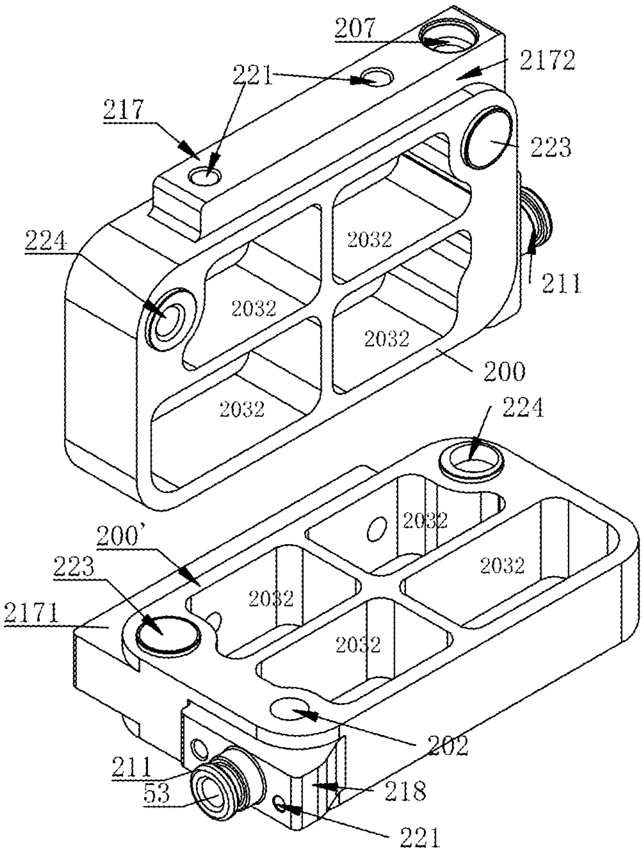
FIG. 15 is a perspective view of two directions of the bridging member of the heat exchange assembly shown in FIG. 12.
Figure 16:
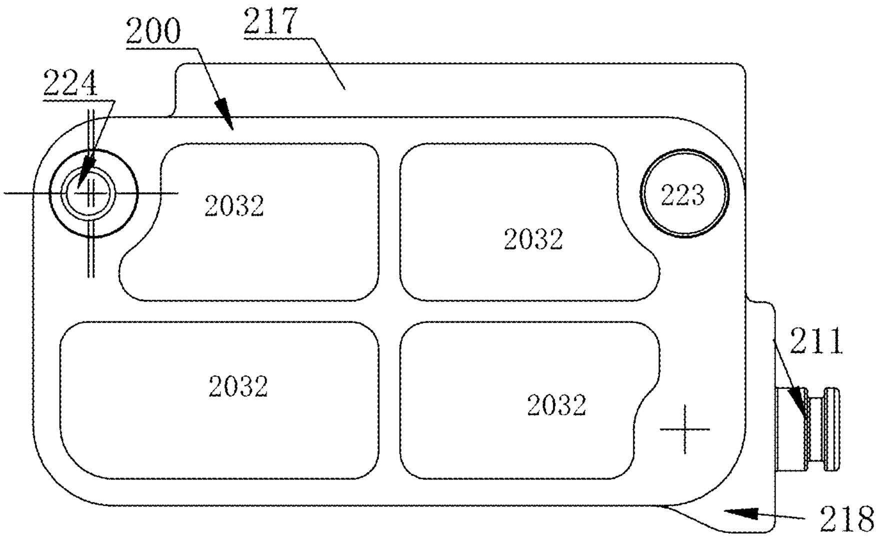
FIG. 16 is a schematic front view of the bridging member shown in FIG. 15.
Figure 17:
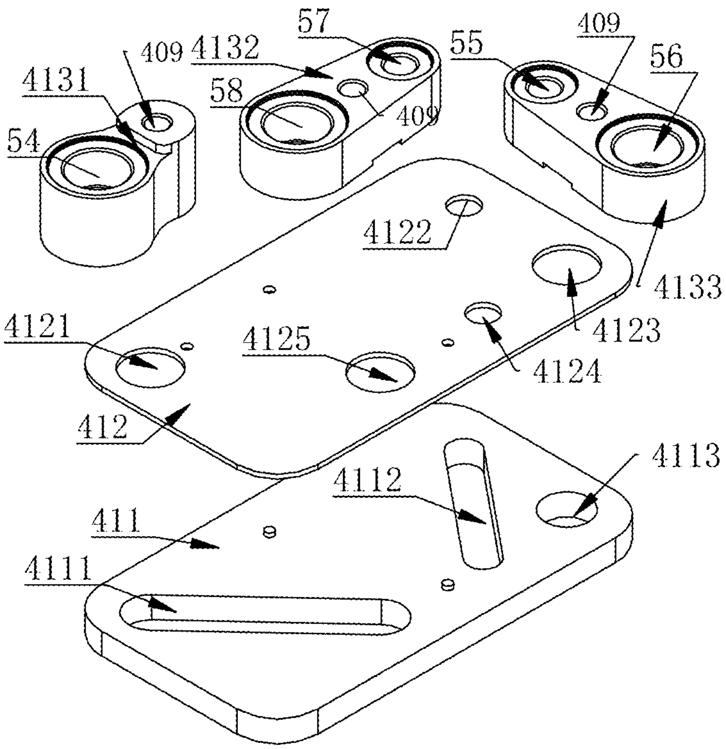
FIG. 17 is an exploded schematic view of the connecting piece of the heat exchange assembly shown in FIG. 12.
Figure 18:
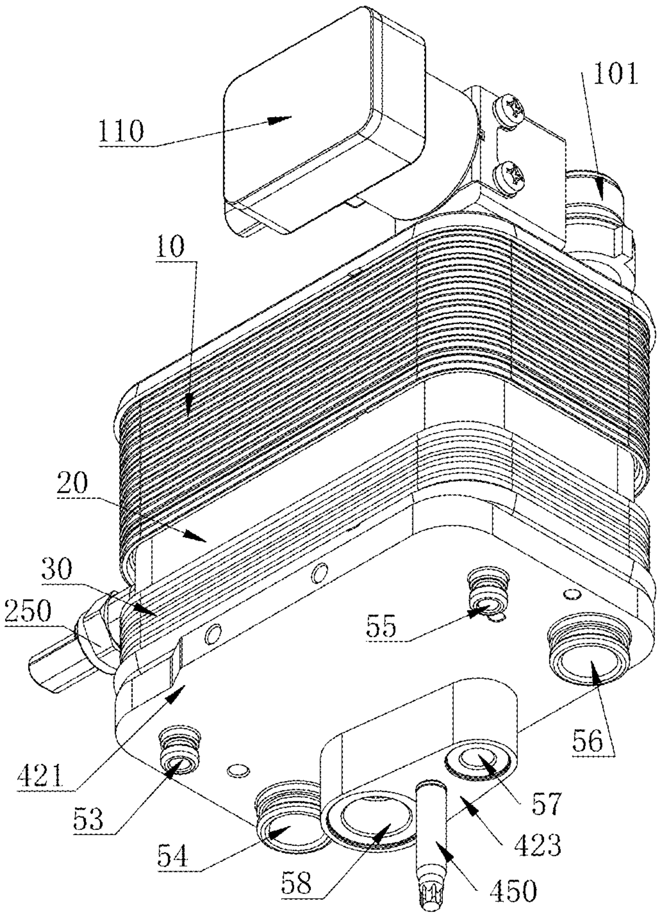
FIG. 18 and FIG. 19 are schematic perspective views of the third embodiment of the heat exchange assembly in two directions.
Figure 19:
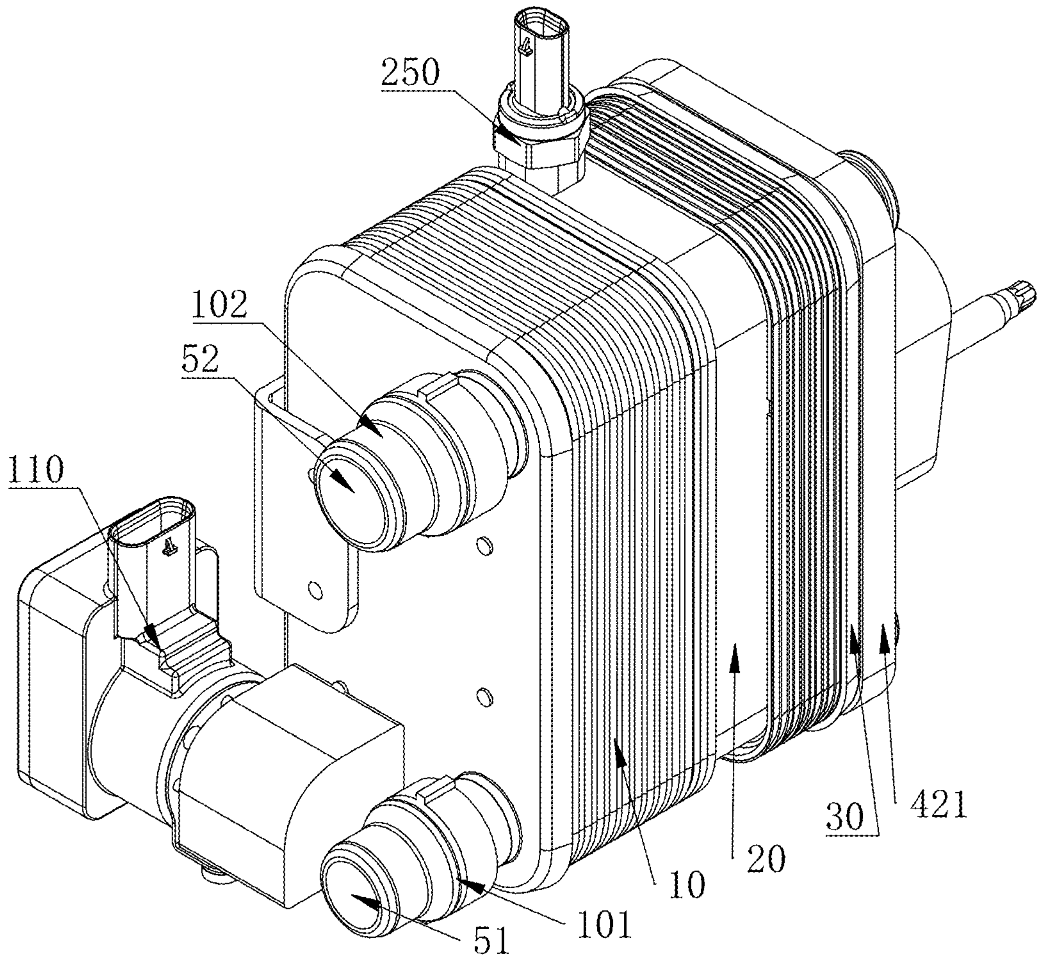

The second embodiment of the heat exchange assembly is described below, referring to FIG. 12 to FIG. 17, where FIG. 12 and FIG. 13 are schematic perspective views of the heat exchange assembly in two directions, FIG. 14 is an exploded schematic diagram of the heat exchange assembly, FIG. 15 is a schematic perspective view of the bridging member of the heat exchange assembly in two directions, FIG. 16 is a schematic front view of the bridging member shown in FIG. 15, FIG. 17 is an exploded schematic view of the connecting piece of the heat exchange assembly shown in FIG. 12. The heat exchange assembly includes a first heat exchange part 10, a bridging member 20, a second heat exchange part 30 and a connecting piece. The heat exchange assembly has a first port 51, a second port 52, a third port 53, a fourth port 54, a fifth port 55, a sixth port 56, a seventh port 57 and an eighth port 58. The bridging member 20 is provided with a third port part 211. The throttle element 110 and the first heat exchange part 10 are fixedly arranged or position-limitedly arranged. The first heat exchange part 10 has four ducts such as a first duct 103 and a second duct 104 (not all shown in the figure). The first heat exchange part 10 includes a first port part 101 and a second port part 102. The first port part 101 has a first port 51 in communication with the coolant. The second port part 102 has a second port 52 in communication with the coolant. The first port 51 is in communication with the second port 52 through the flow passage of the heat exchange core body. The first port part 101 and the second port part 102 may be a part of the side plate of the first heat exchange part, or the two port parts may be processed separately and fixed to the side plate and/or the heat exchange core body of the first heat exchange part by welding.

The bridging member 20 has a first matching part 200. The first heat exchange part 10 has a matching part 100 which is matched with the first matching part 200 of the bridging member. The first matching part 200 is opposite to and matched with the matching part of the first heat exchange part. The matching part 100 of the first heat exchange part 10 and the first matching part 200 of the bridging member both include a flat part. A hole or a groove for communication or openings of a guide part of the bridging member, which are provided at the side of the first matching part 200, are all arranged inside the first matching part. In addition, the periphery of each communication opening is surrounded by the first matching part. The first heat exchange part has a corresponding communication opening at a position corresponding to each communication opening of the bridging member. Each communication opening is located inside the matching part thereof, and each communication opening is surrounded by the matching part; in other words, the two communication openings both include substantially closed structures at the oppositely arranged matching parts. In this way, after the matching part 100 of the first heat exchange part 10 and the first matching part 200 of the bridging member are welded and sealed, the communication opening of the bridging member is in communication with the corresponding communication opening of the first heat exchange part. Specifically, the first heat exchange part 10 has the opening of the first duct 103 and the communication port 105 of the pipeline in communication with the throttle element on the side opposite to the bridging member 20. The first heat exchange part 10 has the opening of the first duct 103 and the communication port 105 in communication with the throttle element on the side opposite to the bridging member 20. The bridging member 20 has corresponding holes 223 and 224 on the side opposite to the first heat exchange part 10. The opening of the hole 223 corresponds to the position of the opening of the first duct 103 of the first heat exchange part. The opening of the hole 224 corresponds to the communication port 105 in communication with the throttle element. The holes 223 and 224 are through holes.

The bridging member 20 has a second matching part 200', and the second matching part 200' faces the second heat exchange part. The second heat exchange part 30 has a matching part 300. Both the matching part 300 of the second heat exchange part 30 and the second matching part 200' of the bridging member include a flat part. Openings of a hole or a groove for communication or a guide part of the bridging member, which are provided at the side of the second matching part, are all arranged inside the second matching part. In addition, the periphery of each communication opening is surrounded by the second matching part. The second heat exchange part has a corresponding communication opening at a position corresponding to each communication opening of the bridging member. Each communication opening is located inside the matching part thereof, and the periphery of each communication opening is surrounded by the matching part; in other words, the periphery of each communication opening includes a part of the matching part. The two communication openings form a substantially closed structure at the matching parts that are oppositely; the matching part 300 of the second heat exchange part 30 corresponds to the position of the second matching part 200' of the bridging member. After the second heat exchange part is welded and sealed with the bridging member, the communication openings of the bridging member on this side may be in communication with the communication openings of the second heat exchange part. Specifically, the second heat exchange part 30 has the openings of three ducts on the side opposite to the bridging member 20: the openings of the third duct 301, the fourth duct 302, and the first duct 303, the bridging member 20 has the opening of the guide hole 202, the opening of the hole 223 and the opening of the hole 224 on the side opposite to the second heat exchange part 30, that is, the second matching part. The opening of the third duct 301 of the second heat exchange part corresponds to the opening of the guide hole 202, the opening of the fourth duct 302 corresponds to the position of the opening of the hole 224. The opening of the first duct 303 corresponds to the position of the opening of the hole 223. The bridging member 20 further includes a third port part 211, and the third port part 211 has a third port 53. The third port part 211 includes an outwardly protruding structure. The third port part 211 may be a structure integrated with the main body of the bridging member, or may be a structure that is processed separately and fixed to the main body of the bridging member by welding. The bridging member 20 is provided with four weight-reducing holes 2032, and the holes 2032 are non-circular through holes, and may also be circular. The guide hole 202 is substantial a blind hole, the opening of the guide hole 202 is on the side where the second matching part is located, and the guide hole 202 is in communication with the third port 53. The bridging member further includes a convex part 217 and a second convex part 218. The convex part 217 protrudes substantially laterally along the main body part. The second convex part 218 is generally protruded outward from a corner of the main body part. A first side surface 2171 of the convex part 217 is lower than the second matching part 200' of the bridging member. A second side surface 2172 of the convex part 217 is lower than the first matching part 200 of the bridging member. Also, two side surfaces of the second convex part are correspondingly lower than the matching parts on the corresponding sides of the bridging member; in other words, the thickness of the convex part 217 and the thickness of the second convex part 218 are both less than the thickness of the main body of the bridging member. By providing the convex part and the second convex part, the size of the main body of the bridging member can be reduced, so that the fixing hole 221 may be at least partially arranged in the convex part 217 and/or the second convex part 218. In addition, at least part of the third port part 211 is located in the second convex part, thereby reducing the size of the main body of the bridging member.

The connecting piece includes a connecting block 411, a connecting plate 412, a first connecting pipe matching part 4131, a second connecting pipe matching part 4132, and a third connecting pipe matching part 4133. The connecting block 411, the connecting plate 412, the first connecting pipe matching part 4131, the second connecting pipe matching part 4132, and the third connecting pipe matching part 4133 can be fixed by welding. A thickness of the connecting block 411 is greater than a thickness of the connecting plate 412. The first connecting pipe matching part 4131 is provided with a fourth port 54. The second connecting pipe matching part 4132 is provided with a seventh port 57 and an eighth port 58. The third connecting pipe matching part 4133 is provided with a fifth port 55 and a sixth port 56. The three connecting pipe matching parts of the connecting piece are further provided with fixing holes 409, which are used for fixing or position limiting with the fixing element 450. The connecting plate 412 is located between the connecting block 411 and the three connecting pipe matching parts. The connecting block is relatively close to the second heat exchange part, or the connecting block is abutted against the second heat exchange part and fixed by welding. The connecting block 411 has three through holes: a through hole 4111, a through hole 4112, and a through hole 4113. The through hole 4111 and the through hole 4112 are non-circular and can be arranged obliquely or arc-shaped, and the shape of which is not limited as long as the positions of the two ends of the through hole 4111 and the through hole 4112 can guide the corresponding flow passages, the through hole 4113 is circular; one side of the through hole 4111, one side of the through hole 4112 and the through hole 4113 are located on one side of the connecting block relatively close to the length direction. The connecting plate has five through holes: a through hole 4121, a through hole 4122, a through hole 4123, a through hole 4124, and a through hole 4125. The positions of the through hole 4121 and the through hole 4125 correspond to the through hole 4111, that is, both the through hole 4121 and the through hole 4125 can be in communication with the through hole 4111; the positions of the through hole 4122 and the through hole 4124 respectively correspond to the through hole 4112, that is, both the through hole 4122 and the through hole 4124 can be in communication with the through hole 4112. The position of the through hole 4123 corresponds to the through hole 4113; the position of the fourth port 54 corresponds to the through hole 4121. The fourth port can be in communication with the through hole 4121, that is, in communication with the through hole 4111 of the connecting block; the position of the eighth port 58 corresponds to the through hole 4125, the eighth port can be in communication with the through hole 4125, that is, in communication with the through hole 4111 of the connecting block; the position of the seventh port 57 corresponds to the through hole 4124. The seventh port can be in communication with the through hole 4124, that is, in communication with the through hole 4112 of the connecting block; the position of the fifth port 55 corresponds to the through hole 4122, the fifth port can be in communication with the through hole 4122, that is, in communication with the through hole 4112 of the connecting block; the position of the sixth port 56 corresponds to the through hole 4123. The sixth port can be in communication with the through hole 4123, that is, in communication with the through hole 4113 of the connecting block. In this embodiment, the connecting piece may be processed by a profile or a stamping piece and formed by assembling, which can reduce the steps of machining.

The flow passage herein includes the following types: the flow passage with a single component as well as the flow passage formed by the combination of two or more components. For example, the eighth port being in communication with the fourth port 54 through flow passages means: through the flow passage of the connecting piece itself as well as through the flow passage formed by the space enclosed by the connecting piece and the groove of the second heat exchange part after being fixed with the second heat exchange part; or the flow passage formed by the concave space of the second heat exchange part after being fixed with the second heat exchange part; and even through the flow passage formed by the combination of the connecting piece and the second heat exchange part and other components, etc.

The heat exchange assembly can facilitate the installation and connection of the thermal management system, reduce the number of connected pipes and connecting ports, and reduce the volume of the system. Taking the heat exchange assembly for a vehicle thermal management system as an example, it should be noted that these components are fixed in actual use. For the sake of clarity, the flow of the refrigerant is shown in the exploded view, which is only for clarity and explanation, referring to FIG. 14 and other views. Taking a vehicle thermal management system as an example, which includes a refrigerant system and a battery thermal management system, the battery thermal management system includes a first port part 101, a second port part 102 of the heat exchange assembly, and a flow passage part in the first heat exchange part in communication with the first port and the second port. The heat of the battery can be transferred to the coolant, which flows through part of the passage of the first heat exchange part through the first port 51 or the second port 52, and exchanges heat with the refrigerant of the other passage of the first heat exchange part. After being cooled down, the coolant flowed back so as to cool the battery. The third port 53, the fourth port 54, the fifth port 55, the sixth port 56, the seventh port 57 and the eighth port 58 are used to be in communication with the refrigerant system. For example, the refrigerant cooled by the condenser enters the heat exchange assembly through the third port 53, or the refrigerant flowing through the reservoir enters the heat exchange assembly through the third port 53. In this way, the high-temperature and high-pressure refrigerant flows to the third duct 301 of the second heat exchange part through the guide hole 202 and exchanges heat with the refrigerant of another passage in the second heat exchange part 30, then flows to the fourth duct 302. The refrigerant to the fourth duct 302 is divided into two parts: a part of the refrigerant flows through the connecting piece and the flow passage formed by the second heat exchange part, such as the through hole 4112 of the connecting block 411 and the through hole 4124 of the connecting plate and then flows to the seventh port 57, as well as flows through the through hole 4112 of the connecting block 411 of the connecting piece, the through hole 4122 of the connecting plate and then flows to the fifth port 55, and then flows out through the fifth port 55 and the seventh port 57, for example, this part of refrigerant flows to the front evaporator through the fifth port 55, and flows to the rear evaporator through the seventh port 57, or this part of refrigerant flows to the rear evaporator through the fifth port 55, and flows to the front evaporator through the seventh port 57, where a throttle element may also be set before the front evaporator or the rear evaporator; the other part of the refrigerant enters the throttle element 110 through the through hole 224 of the bridging member and through the pipe communication port 105 in communication with the throttle element 110. The bridging member is not in communication with the second duct 104. After being throttled by the throttle element 110, the refrigerant enters the second duct 104 of the first heat exchange part 10, exchanges heat with the coolant in the coolant passage of the first heat exchange part, and flows to the first duct 103. Then the refrigerant passes through the through hole 223 of the bridging member to the first duct 303 of the second heat exchange part, and flows out through the through hole 411 of the connecting block, the through hole 4121 of the connecting plate and the fourth port 54, such as flowing back to the compressor. In addition, the sixth port 56 may be used to be in communicating with the refrigerant flowing back from the front evaporator and/or the rear evaporator. This part of the low-temperature refrigerant passes through the through hole 4123 of the connecting plate and the through hole 4113 of the connecting block to the second duct 304 of the second heat exchange part, then the refrigerant flows to the first duct 303, and exchanges heat with the high-temperature refrigerant flowing from the third duct 301 to the fourth duct 302. In the first duct 303, these two parts of the refrigerant can flow back to the compressor through the fourth port after being merged; the eighth port 58 may be used to in communication with the refrigerant flowing back from the rear evaporator and/or the front evaporator, this part of the low-temperature refrigerant passes through the through hole 4125 of the connecting plate and the through hole 4111 of the connecting block, and converges with the rest of the refrigerant to flow back to the compressor through the fourth port. The flow direction in this specification is only for illustration, not for restriction or as an excluded requirement, and other components can be added therein, such as adding other control valves before the compressor. The bridging member 20 is provided with a second mounting part 207 for mounting the sensing element 250, such as a temperature sensing element. The hole of the second mounting part 207 can be in communication with the through hole 223, so that the sensor head 2501 for temperature sensing passes is located in the flow passage where the through hole 223 is located through the mounting part. In this way, the temperature of the refrigerant after passing through the first heat exchange part or the outlet temperature of the evaporator can be obtained.

Figure 20:
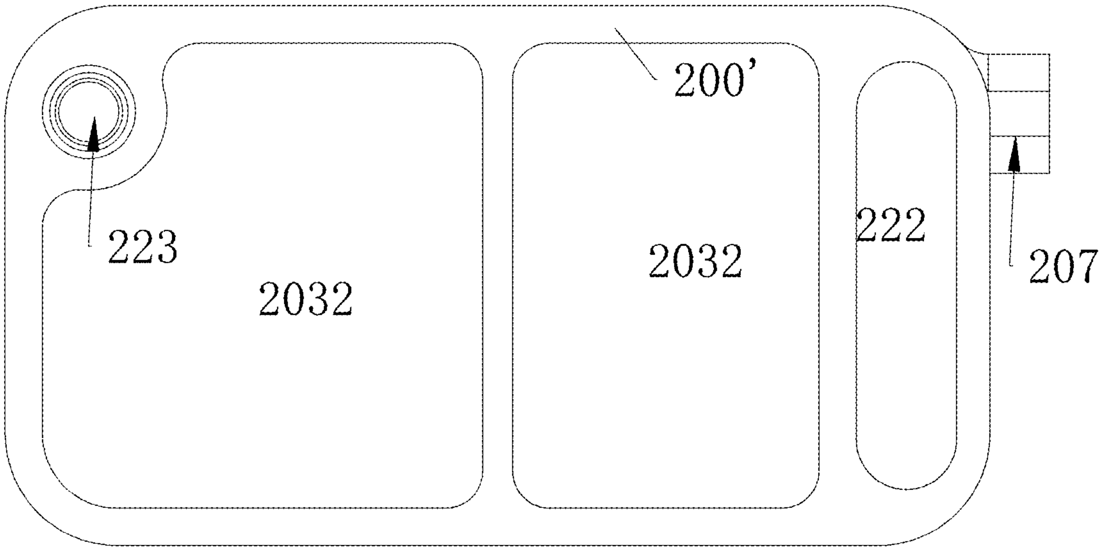
FIG. 20 is a schematic diagram of the bridging member of the heat exchange assembly shown in FIG. 18 and FIG. 19.
Figure 21:
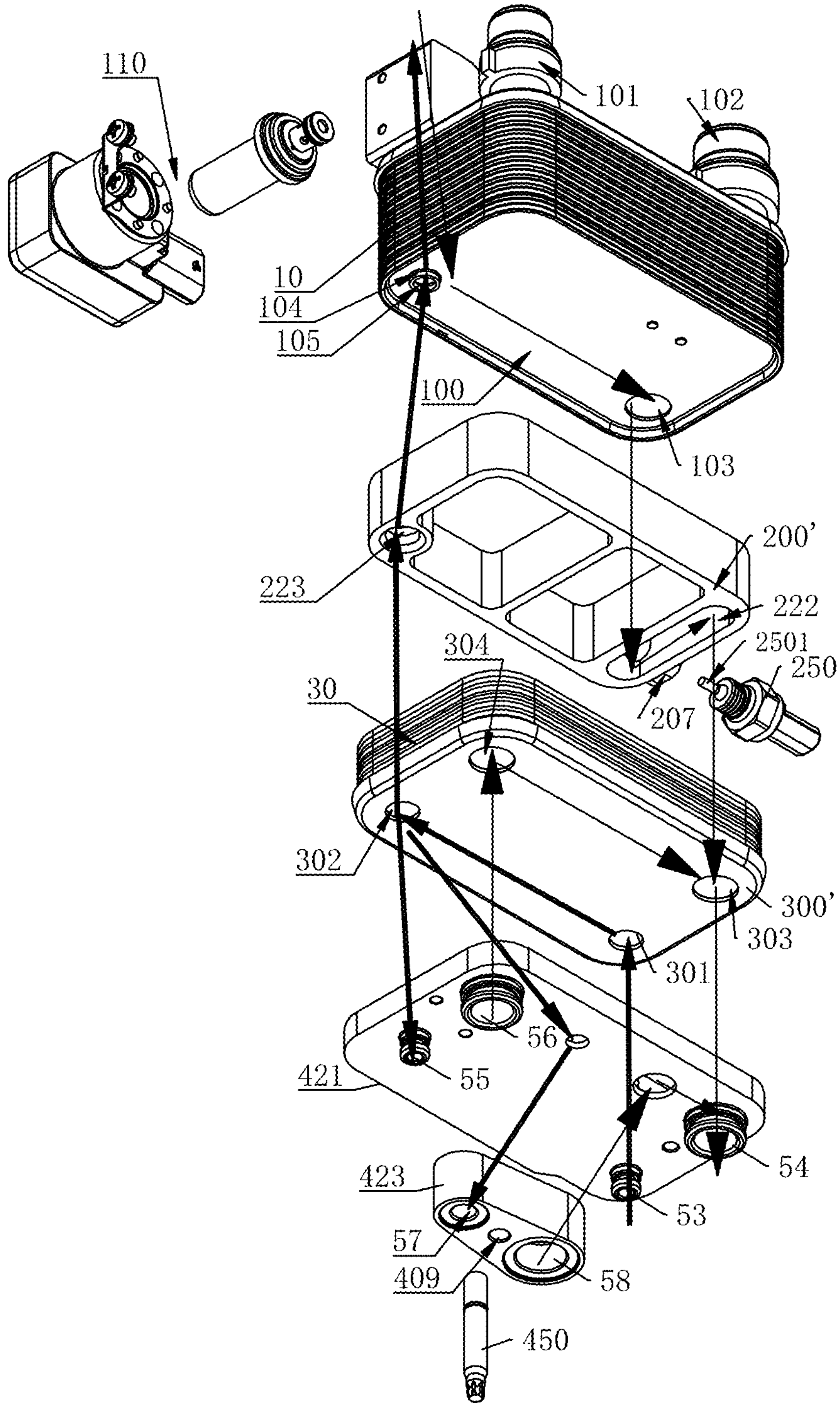
FIG. 21 is an exploded schematic diagram of the heat exchange assembly shown in FIG. 18 and FIG. 19.
Figure 22:
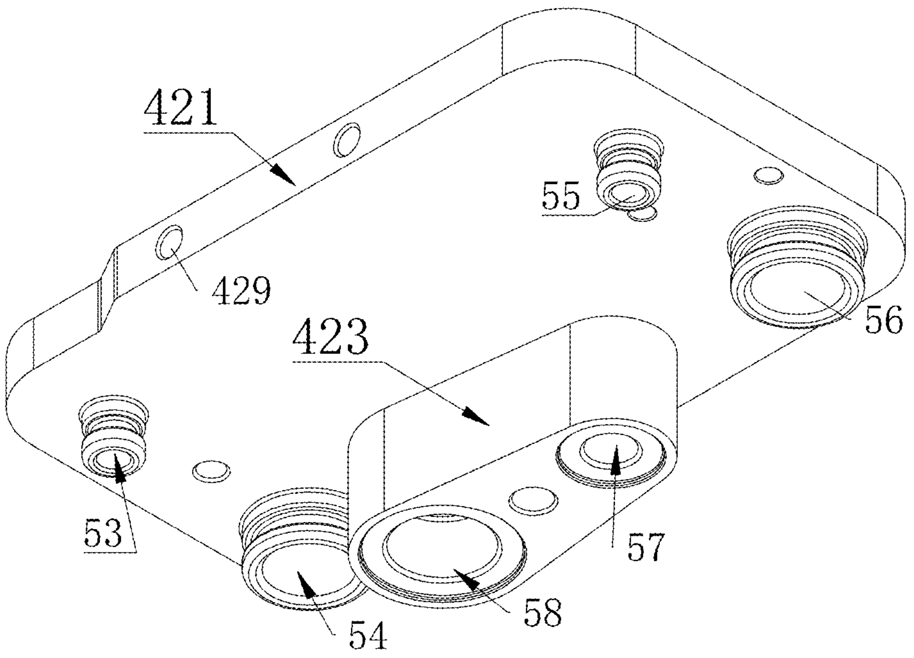
FIG. 22 is a perspective view of the connecting piece of the heat exchange assembly shown in FIG. 18 and FIG. 19.
Figure 23:
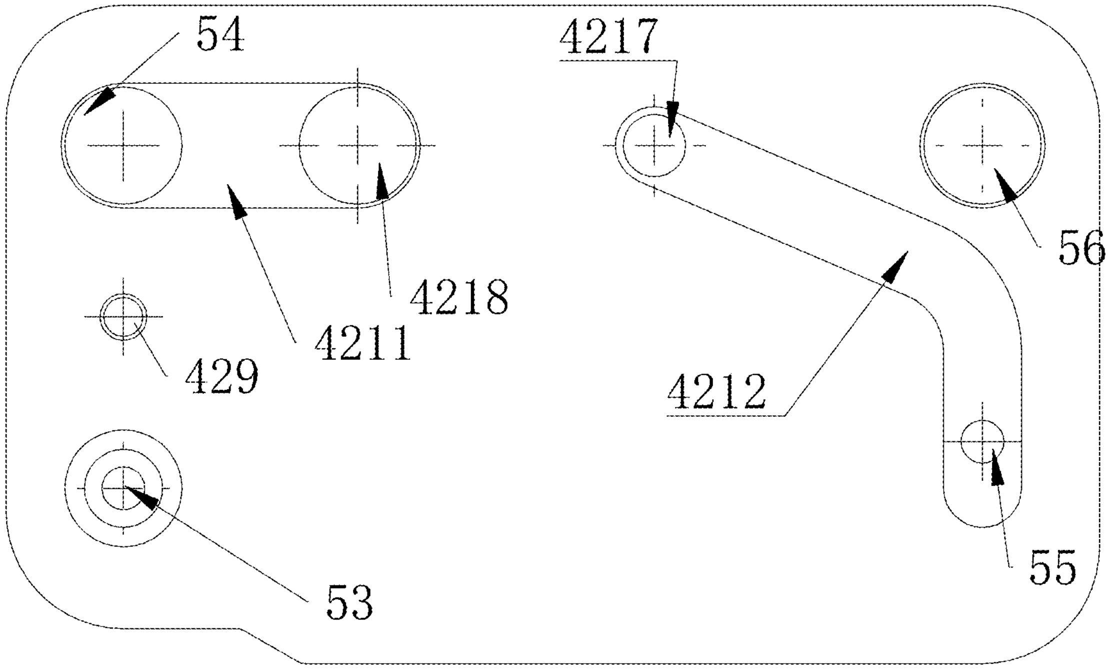
FIG. 23 and FIG. 24 are schematic diagrams of the connecting block of the connecting piece shown in FIG. 22 in the forward and reverse directions.
Figure 24:
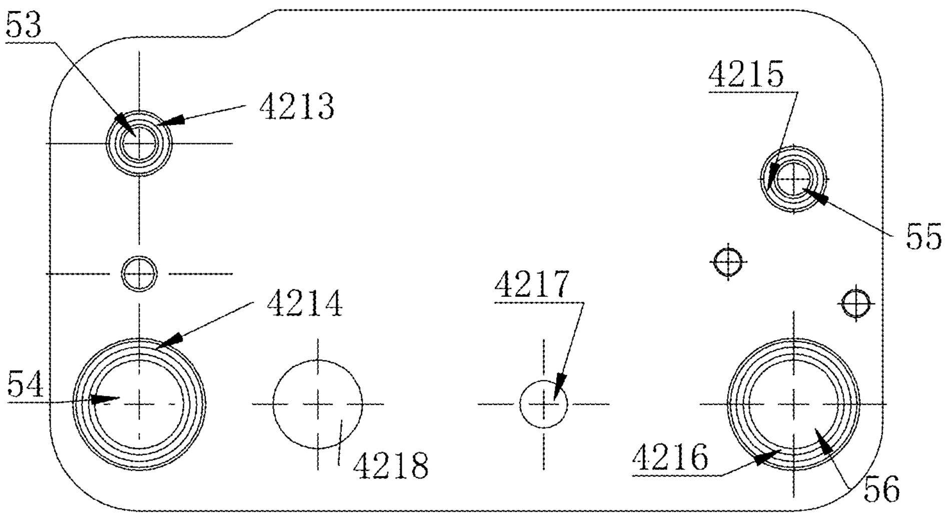
Figure 25:
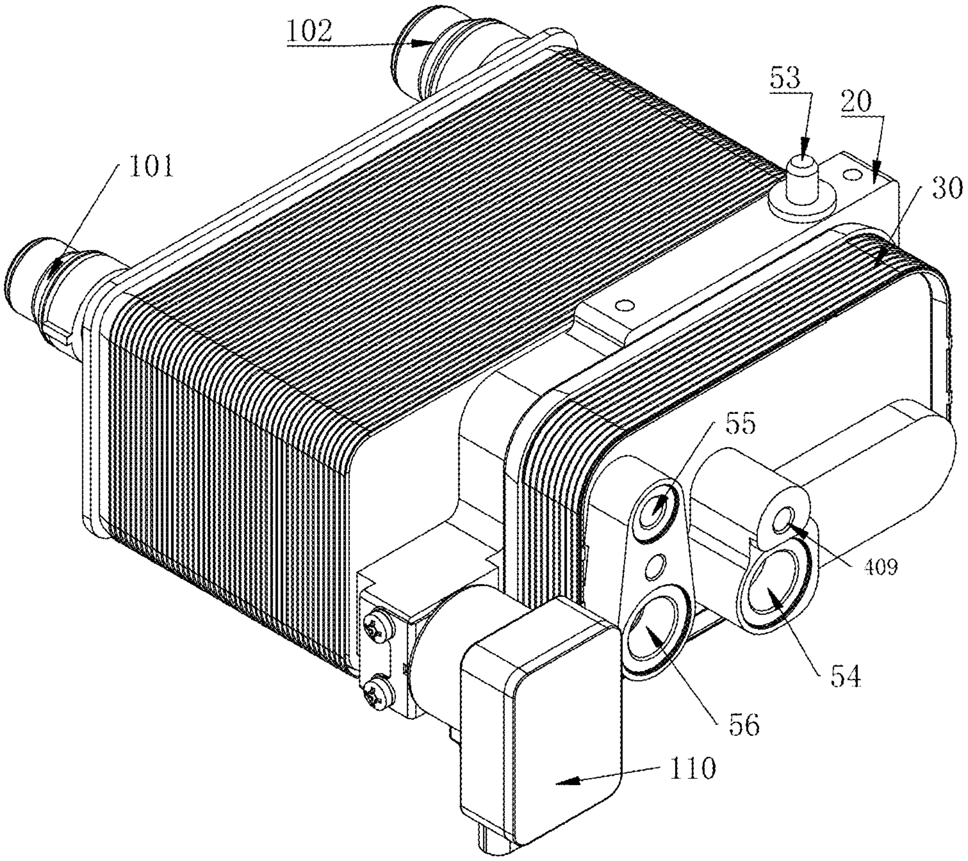
FIG. 25 is a schematic perspective view of the fourth embodiment of the heat exchange assembly.

The third embodiment of the heat exchange assembly is described below, referring to FIG. 18 to FIG. 24, FIG. 18 and FIG. 19 are schematic perspective views of the heat exchange assembly in two directions, FIG. 20 is a schematic diagram of the bridging member of the solution, FIG. 21 is an exploded schematic diagram of the heat exchange assembly, FIG. 22 is a perspective view of the connecting piece of the heat exchange assembly, FIG. 23 and FIG. 24 are schematic diagrams of the forward and reverse directions of the connecting block of the connecting piece shown in FIG. 22.

The heat exchange assembly includes a first heat exchange part 10, a bridging member 20, a second heat exchange part 30 and a connecting piece. The heat exchange assembly has a first port 51, a second port 52, a third port 53, a fourth port 54, a fifth port 55, a sixth port 56, a seventh port 57 and an eighth port 58. A throttle element 110 and the first heat exchange part 10 are fixedly arranged or position-limitedly arranged. The first heat exchange part 10 has four ducts such as a first duct 103 and a second duct 104 (the remaining two ducts are not shown in the figure). The first heat exchange part 10 includes a first port part 101 and a second port part 102. The first port part 101 has the first port 51 in communication with the coolant. The second port part 102 has the second port 52 in communication with the coolant. The first port 51 is in communication with the second port 52 through the flow passage of the heat exchange core body. The first port part 101 and the second port part 102 may be a part of the side plate of the first heat exchange part, or the two port parts may be processed separately and fixed to the side plate and/or the heat exchange core body of the first heat exchange part by welding.

The bridging member 20 has a first matching part 200 and a second matching part 200'. Accordingly, the first matching part 200 is opposite to and matched with the matching part

100 of the first heat exchange part 10. The second matching part 200' is opposite to and matched with the matching part 300 of the second heat exchange part 30. The matching part 100 of the first heat exchange part 10, the matching part 300 of the second heat exchange part 30, and the two matching parts of the bridging member all include flat parts. The bridging member 20 includes a through hole 223 and a through hole 222, and the through hole 222 extends substantially laterally. The bridging member 20 further includes a second mounting part 207. The hole of the second mounting part 207 is in communication with the through hole 222, or the mounting part is disposed on the side close to the through hole 222. The opening of the through hole 223 and the opening of the through hole 222 close to the first heat exchange part are located inside the first matching part and are surrounded by the first matching part. In other words, the periphery of the opening of the through hole 223 and the opening of the through hole 222 has a flat part being adapted for welding and sealing. On the other side, the opening of the through hole 223 and the opening of the through hole 222 are located inside the second matching part and are surrounded by the second matching part, in other words, the periphery of the opening of the through hole 223 and the opening of the through hole 222 has a flat part being adapted for welding and sealing. In this way, after the matching part 100 of the first heat exchange part 10 and the first matching part 200 of the bridging member are welded and sealed, the openings of the two through holes of the bridging member are in communication with the corresponding communication openings of the first heat exchange part. Specifically, the through hole 223 of the bridging member corresponds to and is in communication with the communication port 105. The communication port 105 is in communication with the throttle element. The through hole 222 corresponds to and is in communication with the first duct 103 of the first heat exchange part 10; the openings of the two through holes of the bridging member are in communication with the communication openings corresponding to the second heat exchange part, the through hole 223 of the bridging member corresponds to and is in communication with the fourth duct 302 of the second heat exchange part, the through hole 222 of the bridging member corresponds to and is in communication with the first duct 303 of the second heat exchange part 30.

The bridging member 20 further includes two weight-reducing holes 2032, the arrangement of the holes 2032 can reduce the weight of the bridging member, and can reduce the area of the flat parts of the two matching parts of the bridging member, and thus the matching parts of the bridging member with the first heat exchange part and the second heat exchange part are reduced, so that the area of contact welding can be relatively controlled and the corresponding welding quality can be improved. The manufacture of the bridging member in this solution is relatively simple, for example, profiles can be used. The profile may be provided with four corresponding through holes, and the bridging member may be manufactured by blanking, processing the mounting part and two matching parts on both sides, and the processing steps may be relatively reduced.

The connecting piece includes a connecting block 421 and a port matching piece 423. The connecting block 421 and the port matching piece 423 can be fixed by welding, or can be connected in a sealed manner by a fixing element and a sealing element. The connecting piece is provided with a third port 53, a fourth port 54, a fifth port 55, a sixth port 56, a seventh port 57, and an eighth port 58. The connecting block includes a third port part 4213, a fourth port part 4214, a fifth port part 4215, and a sixth port part 4216. The third port part 4213, the fourth port part 4214, the fifth port part 4215, and the sixth port part 4216 may be of an integral structure with the plate part of the connecting block, or each of these port parts may also be a structure that is processed separately and fixed to the plate part of the connecting block by welding. The connecting block is further provided with a through hole 4217, a through hole 4218, and a fixing hole 429 for fixing or position limiting. The connecting piece has grooves 4211 and 4212 on the side facing the second heat exchange part 30. The groove is a structure similar to a blind hole. The connecting block is provided with a fourth port 54 and a through hole 4218 on opposite sides of the groove 4211, respectively. The fourth port 54 and the through hole 4218 in communication with the groove 4211; the connecting block is provided with a fifth port 55 and a through hole 4217, which are in communication with the groove 4212. The sixth port 56 is in communication with the second duct 304 of the second heat exchange part 30. The fifth port 55 is in communication with the fourth duct 302 of the second heat exchange part 30. The third port 53 is in communication with the third duct 301 of the second heat exchange part 30. The fourth port 54 is in communication with the first duct 303 of the second heat exchange part 30. The port matching piece 423 is provided with a seventh port 57 and an eighth port 58. The seventh port 57 corresponds to and is in communication with the through hole 4217 of the connecting block. The eighth port 58 corresponds to and is in communication with the through hole 4218 of the connecting block.

The flow mode of refrigerant in use is shown in the explosion diagram of FIG. 21, which is only for illustration, and several components are fixed in actual use. A specific vehicle thermal management system includes a refrigerant system and a battery thermal management system. Referring to FIG. 21 and other views, the battery thermal management system includes a first port part 101, a second port part 102 of the heat exchange assembly, and a flow passage part in the first heat exchange part that is in communication with the first port and the second port. The heat of the battery can be transferred to the coolant, which flows through part of the passage of the first heat exchange part through the first port 51 or the second port 52, and exchanges heat with the refrigerant of another passage in the first heat exchange part. After being cooled down, the coolant flows back to cool the battery. The third port 53, the fourth port 54, the fifth port 55, the sixth port 56, the seventh port 57 and the eighth port 58 are used to in communication with the refrigerant system, respectively. For example, the refrigerant cooled by the condenser enters the heat exchange assembly through the third port 53, or the refrigerant flowing through the reservoir enters the heat exchange assembly through the third port 53. In this way, the high-temperature and high-pressure refrigerant flows through the third duct 301 of the second heat exchange part 30, and exchanges heat with the refrigerant of another duct in the second heat exchange part 30, then flows to the fourth duct 302. The refrigerant to the fourth duct 302 is divided into two parts: a part of the refrigerant flows through the flow passage formed by the space where the groove 4212 is located and by cooperation of the connecting piece and the second heat exchange part, and flows out through the fifth port 55 and the seventh port 57. For example, the refrigerant flows to the front evaporator through the fifth port 55, and flows to the rear evaporator through the seventh port 57, or the refrigerant flows to the rear evaporator through the fifth port 55, and flows to the front evaporator through the seventh port 57. A throttle element may also be set before the front evaporator or the rear evaporator; the other part of the refrigerant enters the throttle element 110 through the hole 223 of the bridging member in communication with the fourth duct 302 of the second heat exchange part, the communication port 105 in communication with the throttle element. After being throttled by the throttle element 110, the refrigerant enters the second duct 104 of the first heat exchange part 10, exchanges heat with the coolant of the coolant flow passage in the refrigerant passage of the first heat exchange part, and flows to the first duct 103. Then the refrigerant passes through the flow passage formed by the through hole 222 and cooperating with the bridging member, the first heat exchange part and the second heat exchange part, and flows to the first duct 303 of the second heat exchange part, and then the refrigerant flows out through the fourth port in communication with the first duct 303, such as flowing back to the compressor. In addition, the sixth port 56 may be used to be in communication with the refrigerant flowing back from the front evaporator or the rear evaporator. This low-temperature refrigerant flows to the first duct 303 through the second duct 304 of the second heat exchange part, and exchanges heat with the high-temperature refrigerant flowing from the third duct 301 to the fourth duct 302. In the first duct 303, this part of the refrigerant and the rest of the refrigerant may flow back to the compressor through the fourth port after being merged. In addition, the eighth port 58 can be used to be in communication with the refrigerant flowing back from the rear evaporator or the front evaporator. This part of the low-temperature refrigerant flows to the fourth port through the flow passage formed by the groove 4211 and cooperating with the connecting piece and the second heat exchange part. The three parts of refrigerants are merged and then flow back to the compressor through the fourth port. The flow direction in this specification is only for illustration, not for restriction or as excluded requirement, and other components can be added therein, such as adding other control valves before the compressor. A second mounting part 207 is further provided on the bridging member 20 for mounting the sensing element 250, such as a temperature sensing element. The sensor head 2501 for temperature sensing passes through the mounting part and is located in the flow passage where the through hole 222 is located. In this way, the temperature of the refrigerant after passing through the first heat exchange part or the outlet temperature of the evaporator can be obtained.

In this embodiment, several refrigerant connecting ports are arranged on the connecting piece, so that the connection is more convenient in use, and the pipelines are also arranged on the same side.

Figure 26:
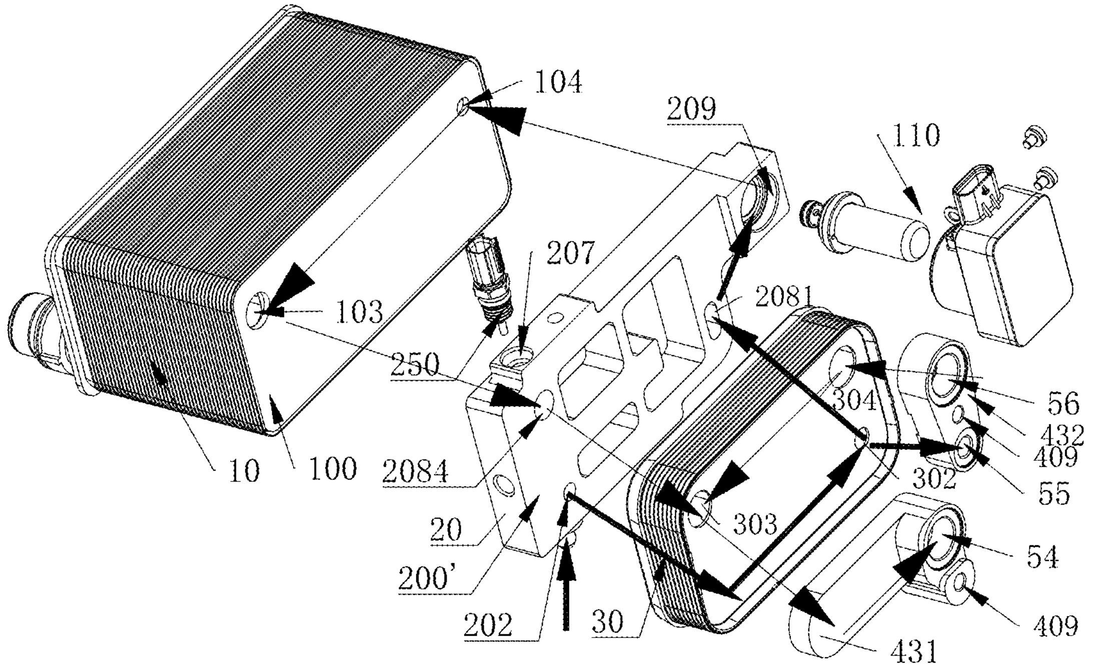
FIG. 26 is an exploded schematic diagram of the heat exchange assembly shown in FIG. 25.
Figure 27:
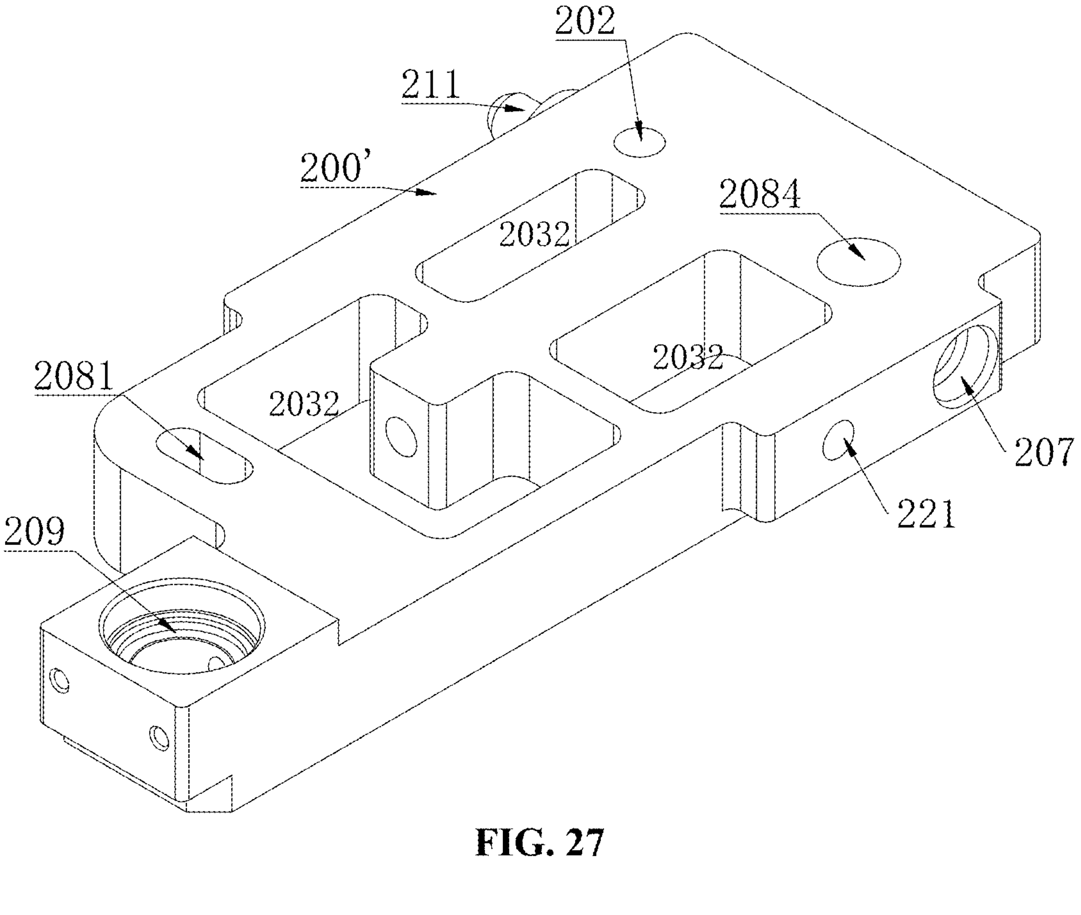
FIG. 27 is a schematic perspective view of the bridging member of the heat exchange assembly shown in FIG. 25.
Figure 28:
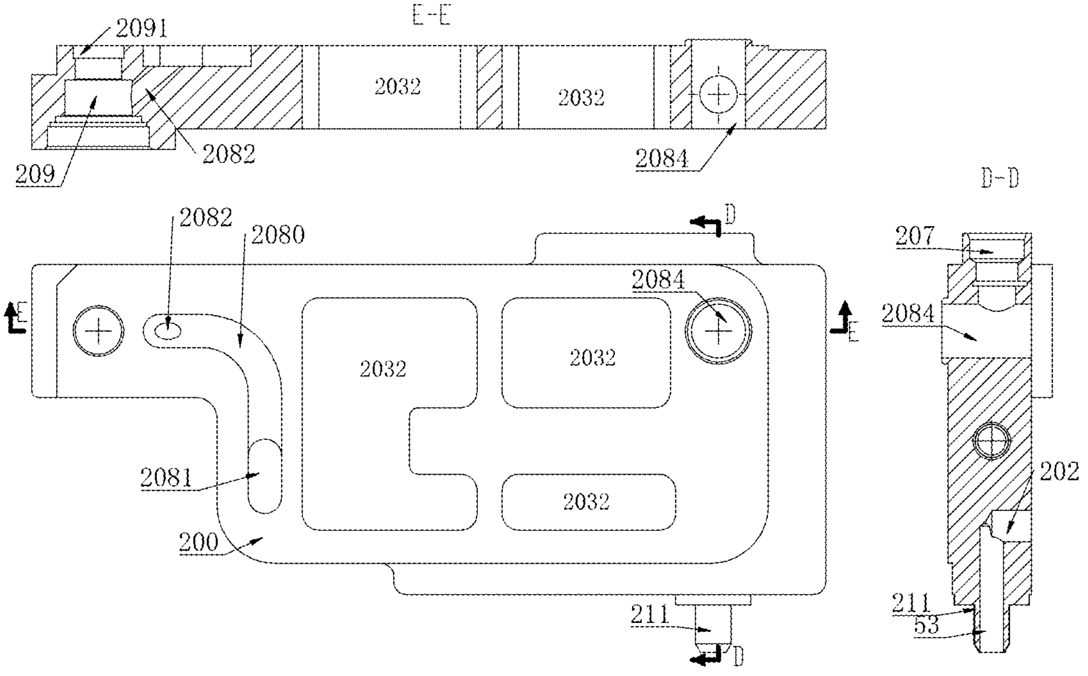
FIG. 28 is a front view of the bridging member shown in FIG. 27 and a schematic diagram of a cross-sectional view of the bridging member along the E-E direction and the D-D direction.
Figure 29:
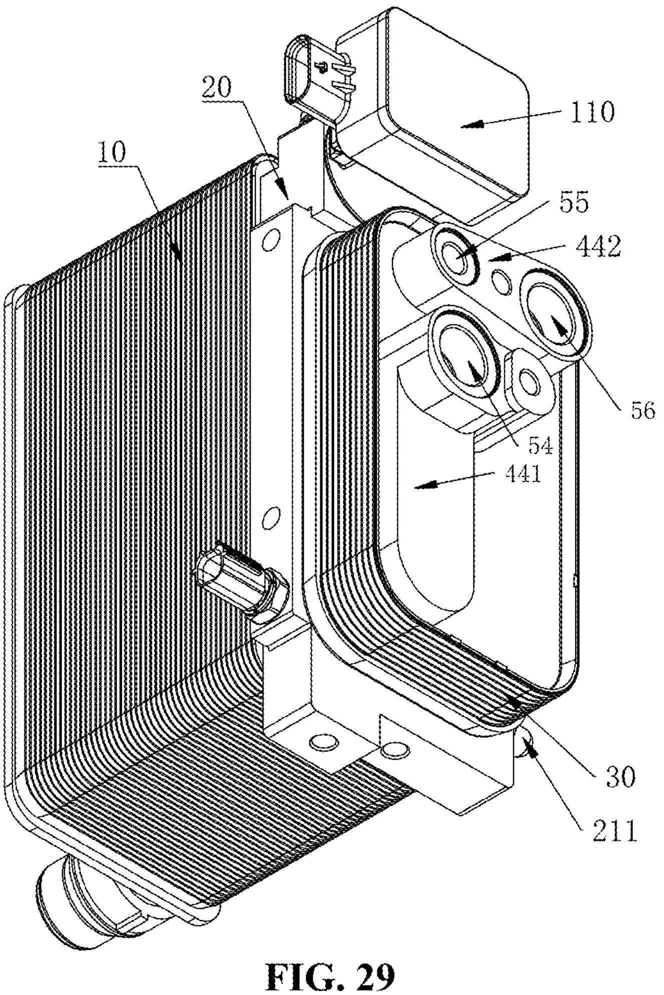
FIG. 29 is a schematic perspective view of the fifth embodiment of the heat exchange assembly.

The heat exchange assembly may also be shown in FIG. 25 to FIG. 28, FIG. 25 is a schematic perspective view of the fourth embodiment of the heat exchange assembly, FIG. 26 is an exploded schematic diagram of the heat exchange assembly, FIG. 27 is a schematic perspective view of the bridging member of the heat exchange assembly, FIG. 28 is a front view of the bridging member shown in FIG. 27 and a schematic diagram of a cross-sectional view of the bridging member along the E-E direction and the D-D direction.

The heat exchange assembly includes a first heat exchange part 10, a throttle element 110, a bridging member 20, a second heat exchange part 30, and a connecting piece. Most of the bridging member 20 is located between the first heat exchange part 10 and the second heat exchange part 30, the connecting piece 40 is located on the other side of the second heat exchange part 30. That is, the bridging member 20 and the connecting piece 40 are arranged on both sides of the second heat exchange part, respectively. The first heat exchange part 10, the bridging member 20 and the second heat exchange part 30 are fixed by welding, or the first heat exchange part 10, the bridging member 20, the second heat exchange part 30 and the connecting piece are fixed by welding. The first heat exchange part 10 is larger than the second heat exchange part 30.

The first heat exchange part 10 has a heat exchange core body, the first heat exchange part 10 has two flow passages through which fluid flows for heat exchange, and the two fluid flow passages are separated from each other. The first heat exchange part 10 includes interlayer flow passages separated by stacks of plates. At least two fluids may flow through the first heat exchange part 10, the two fluids can exchange heat in the first heat exchange part, for example, one fluid is a refrigerant, and the other fluid may be a coolant for cooling heating elements such as batteries; in addition, the heat exchange part may also be used for three fluids. For example, one fluid is refrigerant, the other two fluids may be coolant. The two coolants can be controlled and selected to exchange heat with the refrigerant, and then the coolant can be used to cool the components that need to be cooled after heat exchange and temperature reduction. The following two fluids are used as examples to illustrate.

The heat exchange assembly has a first port 51, a second port 52, a third port 53, and a fourth port 54, a fifth port 55 and a sixth port 56. The first heat exchange part is provided with the first port part 101 and a second port part 102. The bridging member 20 is provided with the third port part 211. The connecting piece 40 is provided with the fourth port 54, the fifth port 55 and the sixth port 56. The throttle element 110 and the bridging member 20 are fixed or position limited. The first heat exchange part 10 has four ducts such as a first duct 103 and a second duct 104 (the other two ducts are not shown). The first heat exchange part 10 includes a first port part 101 and a second port part 102. The first port part 101 has the first port 51 in communication with the coolant. The second port part 102 has the second port 52 in communication with the coolant. The first port 51 is in communication with the second port 52 through the flow passage of the heat exchange core body. The first port part 101 and the second port part 102 may be a part of the side plate of the first heat exchange part, or the two port parts may be processed separately and fixed to the side plate and/or the heat exchange core body of the first heat exchange part by welding.

The bridging member 20 has a first matching part 200 and a second matching part 200'. Accordingly, the first heat exchange part 10 has a matching part 100, and the matching part 100 is correspondingly matched with the first matching part 200 of the bridging member. The second heat exchange part 30 has a matching part 300, and the matching part 300 is correspondingly matched with the second matching part 200' of the bridging member; the matching part 100 of the first heat exchange part 10, the matching part 300 of the second heat exchange part 30, and the two matching parts of the bridging member all include flat parts. The openings of the hole or groove or the guide part of the bridging member for communication on the side of the first matching part 200 are all located inside the first matching part. In addition, the periphery of each communication opening is surrounded by the first matching part. The first heat exchange part has a corresponding communication opening at a position corresponding to each communication opening of the bridging member. Each communication opening of the first heat exchange part is located inside the matching part thereof, and each communication opening is surrounded by the matching part. In this way, after the matching part 100 of the first heat exchange part 10 and the first matching part 200 of the bridging member are welded and sealed, the communication opening of the bridging member may be in communication with the communication opening corresponding to the first heat exchange part. In other words, the periphery of each communication opening includes a part of the matching part. The two communication openings form a substantially closed structure at the oppositely arranged matching parts. The first heat exchange part 10 has the opening of the first duct 103 and the opening of the second duct 104 on the side opposite to the bridging member 20. The bridging member 20 has corresponding holes 2084 and 2091 on the side opposite to the first heat exchange part 10. The opening of the hole 2084 corresponds to the position of the opening of the first duct 103 of the first heat exchange part. The opening of the hole 2091 corresponds to the position of the opening of the second duct 104 of the first heat exchange part. In addition, the bridging member 20 also has a groove 2080 on the side opposite to the first heat exchange part 10, and one side of the groove 2080 is in communication with the hole 2081. On the other side of the groove, there is also an inclined hole 2082. The other end of the inclined hole 2082 is in communication with the hole of the mounting part 209. In this way, the hole of the mounting part 209 is in communication with the hole 2081 through the inclined hole 2082 and the groove 2080.

The matching part 300 of the second heat exchange part 30 corresponds to the position of the second matching part 200' of the bridging member. After the second heat exchange part is welded and sealed with the bridging member, the communication openings of the bridging member on this side are in communication with the communication openings of the second heat exchange part, respectively. Specifically, the second heat exchange part 30 has the openings of three ducts on the side opposite to the bridging member 20: the openings of the third duct 301, the fourth duct 302, and the first duct 303, the bridging member 20 has the opening of the guide hole 202, the opening of the hole 2081 and the opening of the hole 2084 on the side opposite to the second heat exchange part 30, that is, on the second matching part. The opening of the third duct 301 of the second heat exchange part corresponds to the opening of the guide hole 202, the opening of the fourth duct 302 corresponds to the position of the opening of the hole 2081. The opening of the first duct 303 corresponds to the position of the opening of the hole 2084.

The bridging member 20 includes a third port part 211, a second mounting part 207 and a mounting part 209. The third port part 211 has a third port 53. The third port part 211 includes an outwardly protruding structure. The third port part 211 may be a structure integrated with the main body of the bridging member, or may be a structure that is processed separately and fixed to the main body of the bridging member by welding. The second mounting part 207 is used for mounting the sensing element, and the mounting part 209 is used for mounting the throttle element. The hole of the second mounting part 207 is in communication with the hole 2084. The sensor head 2501 for temperature sensing of the temperature sensing element passes through the second mounting part 207 and is located in the flow passage where the hole 2084 is located. In this way, the temperature of the refrigerant after passing through the first heat exchange part or the outlet temperature of the evaporator can be obtained. In addition, the throttle element may also be mounted in other directions, such as extending the mounting part from the side of the bridging member toward the inside of the bridging member. The axis of the throttle element is substantially parallel to the longitudinal direction of the bridging member.

In addition, the bridging member 20 is provided with three weight-reducing holes 2032, so as to reduce the weight of the bridging member and reduce the area of the flat part to be welded, thereby improving the welding quality. The bridging member 20 is further provided with a fixing hole 221 for fixing.

The connecting piece includes a first connecting part 431 and a second connecting part 432. The first connecting part 431 includes a fourth port 54, and the second connecting part 432 includes a fifth port 55 and a sixth port 56. The first connecting part 431 has a space corresponding to the first duct 303 of the second heat exchange part 30 to obtain the flow path from the first duct 303 to the fourth port. Specifically, the flow path can be as shown in the figure. In addition, the flow path may also be fixed at a corresponding position around the first duct 303 in a joint manner. The fifth port 55 of the second connecting part 432 corresponds to and fits with the fourth hole 302 of the second heat exchange part 30. The sixth port 56 of the second connecting part 432 corresponds to and fits with the second hole 304 of the second heat exchange part 30. The connecting piece may further include a fixing element 450 for fixing or position limiting. The first connecting part 431 and the second connecting part 432 can be provided with fixing holes. The fixing element 450 may be fixed or position limited to the fixing hole 409.

The heat exchange assembly can facilitate the installation and connection of the thermal management system, reduce the number of connected pipes, and reduce the volume of the system. Taking the heat exchange assembly for a vehicle thermal management system as an example, it should be noted that these components are fixed in actual use. For the sake of clarity, the flow of the refrigerant is shown in the exploded view, which is only for clarity and explanation. In a specific vehicle thermal management system, the vehicle thermal management system includes a refrigerant system and a battery thermal management system. Referring to FIG. 26 and other views, the battery thermal management system includes a first port part 101 and a second port part 102 of the heat exchange assembly, and a flow passage part in the first heat exchange part that is in communication with the first port and the second port. The heat of the battery can be transferred to the coolant, which flows through part of the passage of the first heat exchange part through the first port 51 or the second port 52, and exchanges heat with the refrigerant of another passage in the first heat exchange part. After being cooled down, the coolant flows back to cool the battery. The third port 53, the fourth port 54, the fifth port 55 and the sixth port 56 are used to be in communication with the refrigerant system, respectively. For example, the refrigerant cooled by the condenser enters the heat exchange assembly through the third port 53, or the refrigerant flowing through the reservoir enters the heat exchange assembly through the third port 53. In this way, the high-temperature and high-pressure refrigerant passes through the guide hole 202 and flows to the third duct 301 of the second heat exchange part, and, and flows to the fourth duct 302 after heat exchange with the refrigerant of another flow passage in the second heat exchange part 30. The refrigerant to the fourth duct 302 is divided into two parts: a part of the refrigerant flows out from the fifth port 55 through the second connecting part 442, for example, to the front evaporator or other evaporators through the fifth port 55, and a throttle element may be arranged in front of the front evaporator. The other part of the refrigerant enters the throttle element 110 through the hole 2081 of the bridging member, the groove 2080 and the inclined hole 2082. After being throttled by the throttle element 110, the other part of refrigerant enters the second duct 104 of the first heat exchange part 10 through the hole 2091, and exchanges heat with the coolant of the coolant passage in the refrigerant passage of the first heat exchange part, and flows to the first duct 103, and then flows out through the hole 2084 of the bridging member, the first duct 303 of the second heat exchange part, and the fourth port communication with the first duct 303, such as flowing back to the compressor. In addition, the sixth port 56 may be used to be in communication with the refrigerant flowing back from the front evaporator or other evaporator. This low-temperature refrigerant flows to the first duct 303 through the second duct 304 of the second heat exchange part, and exchanges heat with the high-temperature refrigerant flowing from the third duct 301 to the fourth duct 302. In the first duct 303, the two parts of the refrigerant may flow back to the compressor through the fourth port after being merged. In this way, part of the low-temperature refrigerant can be used to cool the high-temperature refrigerant, which may reduce the condensing temperature of the refrigerant without increasing the temperature of the refrigerant flowing back the compressor. The flow direction in this specification is only for illustration, not for restriction or as an excluded requirement, and other components can be added therein, such as adding other control valves before the compressor.

Figure 30:
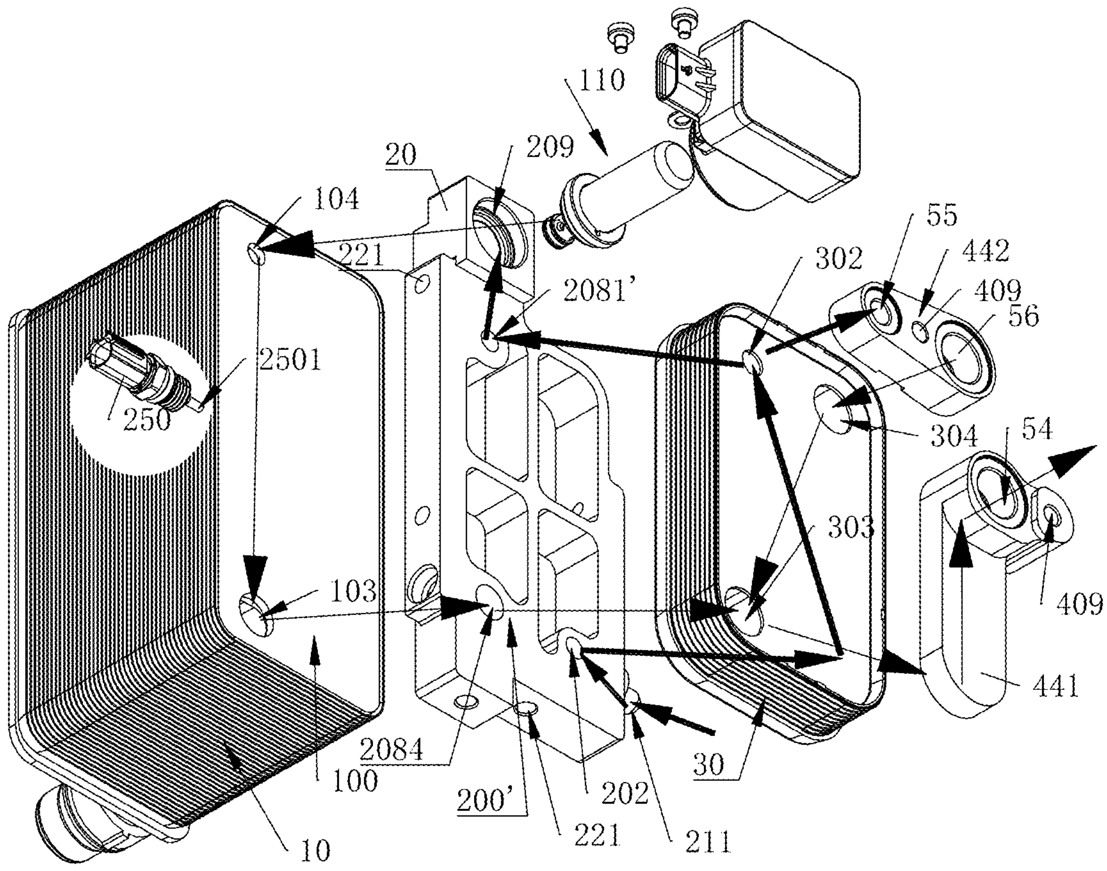
FIG. 30 is an exploded schematic diagram of the heat exchange assembly shown in FIG. 29.
Figure 31:
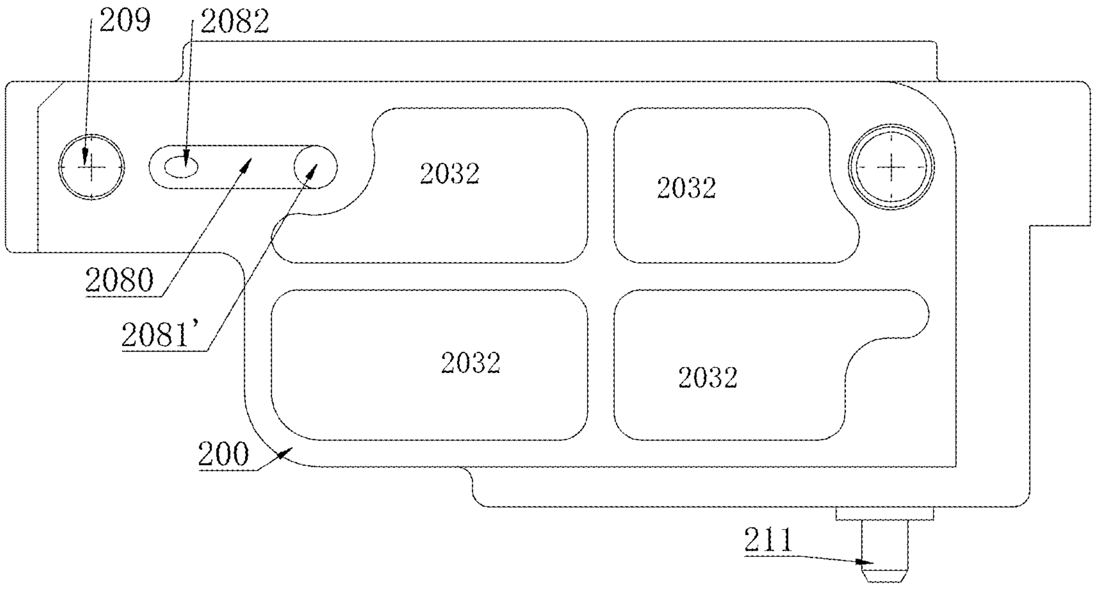
FIG. 31 is a schematic diagram of the bridging member of the heat exchange assembly shown in FIG. 29.
Figure 32:
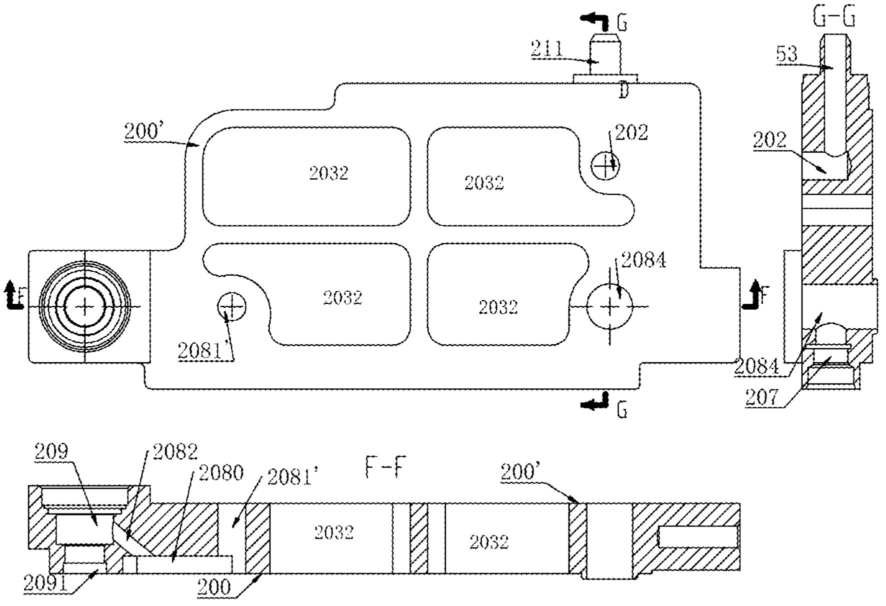
FIG. 32 is a schematic diagram of the bridging member shown in FIG. 31 in another direction and a schematic diagram of a cross-section in the G-G direction and the F-F direction.

The heat exchange assembly may also be shown in FIG. 29 to FIG. 32, FIG. 29 is a schematic perspective view of the fifth embodiment of the heat exchange assembly, FIG. 30 is an exploded schematic diagram of the heat exchange assembly, FIG. 31 is a schematic diagram of the bridging member of the heat exchange assembly, FIG. 32 is a schematic diagram of another direction of the bridging member shown in FIG. 31 and a schematic diagram of a cross-section in the G-G direction and the F-F direction. The heat exchange assembly includes a first heat exchange part 10, a throttle element 110, a bridging member 20, a second heat exchange part 30, and a connecting piece 40. Most of the bridging member 20 is located between the first heat exchange part 10 and the second heat exchange part 30, the connecting piece is located on the other side of the second heat exchange part 30. That is, the bridging member 20 and the connecting piece are arranged on both sides of the second heat exchange part, respectively. The first heat exchange part 10, the bridging member 20 and the second heat exchange part 30 are fixed by welding, or the first heat exchange part 10, the bridging member 20, the second heat exchange part 30 and the connecting piece are fixed by welding. The first heat exchange part 10 is larger than the second heat exchange part 30.

The first heat exchange part 10 has a heat exchange core body, the first heat exchange part 10 at least includes two flow passages through which fluid flows for heat exchange, and the two fluid flow passages are separated from each other. The first heat exchange part 10 includes interlayer flow passages separated by stacks of plates. At least two fluids may flow through the first heat exchange part 10, the two fluids can exchange heat in the first heat exchange part, for example, one fluid is a refrigerant, and the other fluid may be a coolant for cooling heating elements such as batteries or cooling carriages; in addition, the heat exchange part may also be used for three fluids. For example, one fluid is refrigerant, the other two fluids may be coolant. These two coolants may be controlled and selected to exchange heat with the refrigerant, and then the coolant may be used to cool the components that need to be cooled after heat exchange and temperature reduction. The following two fluids are used as examples to illustrate.

The heat exchange assembly has a first port 51, a second port 52, a third port 53, a fourth port 54, a fifth port 55 and a sixth port 56. The first heat exchange part is provided with the first port part 101 and the second port part 102. The bridging member 20 is provided with the third port part 211. The connecting piece is provided with the fourth port 54, the fifth port 55 and the sixth port 56. The throttle element 110 and the bridging member 20 are fixed or position limited. The first heat exchange part 10 has four duct such as a first duct 103 and a second duct 104 (two ducts in communication with the coolant are not shown). The first heat exchange part 10 includes a first port part 101 and a second port part 102. The first port part 101 has the first port 51 in communication with the coolant. The second port part 102 has the second port 52 in communication with the coolant. The first port 51 is in communication with the second port 52 through the flow passage of the heat exchange core body. The first port part 101 and the second port part 102 may be a part of the side plate of the first heat exchange part, or the two port parts may be processed separately and fixed to the side plate and/or the heat exchange core body of the first heat exchange part by welding. The first port part and the second port part may also be fixed together with the first heat exchange part in the form of pipe joints.

The bridging member 20 has a first matching part 200 and a second matching part 200'. Accordingly, the first heat exchange part 10 has a matching part 100, and the matching part 100 is correspondingly matched with the first matching part 200 of the bridging member. The second heat exchange part 30 has a matching part 300, and the matching part 300 is correspondingly matched with the second matching part 200' of the bridging member; the matching part 100 of the first heat exchange part 10, the matching part 300 of the second heat exchange part 30, and the two matching parts of the bridging member all include flat parts. The hole or groove or the opening of the guide part for communication of the bridging member provided on the side of the first matching part 200 are all located inside the first matching part. In addition, the periphery of each communication opening is surrounded by the first matching part. The first heat exchange part has a corresponding communication opening at a position corresponding to each opening of the bridging member for communication. Each communication opening of the first heat exchange part is located inside the matching part thereof, and each communication opening is surrounded by the matching part. In this way, after the matching part 100 of the first heat exchange part 10 and the first matching part 200 of the bridging member are welded and sealed, the communication opening of the bridging member may be in communication with the communication opening corresponding to the first heat exchange part. In other words, the periphery of each communication opening includes a part of the matching part. The two communication openings form a substantially closed structure at the matching parts being opposite arranged. The first heat exchange part 10 has the opening of the first duct 103 and the opening of the second duct 104 on the side opposite to the bridging member 20. The bridging member 20 has corresponding holes 2084 and 2091 on the side opposite to the first heat exchange part 10. The opening of the hole 2084 corresponds to the position of the opening of the first duct 103 of the first heat exchange part. The opening of the hole 2091 corresponds to the position of the opening of the second duct 104 of the first heat exchange part. In addition, the bridging member 20 also has a groove 2080 on the side opposite to the first heat exchange part 10, and the groove 2080 is in communication with the hole 2081'. On the other side of the groove, an inclined hole 2082 is further provided. The other end of the inclined hole 2082 is in communication with the hole of the mounting part 209. In this way, the hole of the mounting part 209 is in communication with the hole 2081' through the inclined hole 2082 and the groove 2080.

The matching part 300 of the second heat exchange part 30 corresponds to the position of the second matching part 200' of the bridging member. After the second heat exchange part is welded and sealed with the bridging member, the communication openings of the bridging member on this side are in communication with the communication openings of the second heat exchange part. Specifically, the second heat exchange part 30 has the openings of three ducts on the side opposite to the bridging member 20: the openings of the third duct 301, the fourth duct 302, and the first duct 303, the bridging member 20 has the opening of the guide hole 202, the opening of the hole 2081' and the opening of the hole 2084 on the side opposite to the second heat exchange part 30, The opening of the third duct 301 of the second heat exchange part corresponds to the position of the opening of the guide hole 202, the opening of the fourth duct 302 corresponds to the position of the opening of the hole 2081'. The opening of the first duct 303 corresponds to the position of the opening of the hole 2084.

The bridging member 20 includes a third port part 211, a second mounting part 207 and a mounting part 209. The third port part 211 has a third port 53. The third port part 211 includes an outwardly protruding structure. The third port part 211 may be a structure integrated with the main body of the bridging member, or may be a structure that is processed separately and fixed to the main body of the bridging member by welding. The second mounting part 207 is used for cooperating with mounting the sensing element 250. The mounting part 209 is used for cooperating with mounting the throttle element 110. The hole of the second mounting part 207 is in communication with the hole 2084. The sensing element can be such as a temperature sensing element. The sensor head 2501 for temperature sensing passes through the second mounting part 207 and is located in the flow passage where the hole 2084 is located. In this way, the temperature of the refrigerant after passing through the first heat exchange part or the outlet temperature of the evaporator can be obtained.

In addition, the bridging member 20 is provided with four weight-reducing holes 2032, so as to reduce the weight of the bridging member and reduce the area of the flat part to be welded, thereby improving the welding quality. The bridging member 20 is further provided with a fixing hole 221 for fixing.

The connecting piece includes a first connecting part 441 and a second connecting part 442. The first connecting part 441 includes a fourth port 54, and the second connecting part 442 includes a fifth port 55 and a sixth port 56. The first connecting part 441 has a space corresponding to the first duct 303 of the second heat exchange part 30 to obtain the flow path from the first duct 303 to the fourth port. In addition, the flow path may also be fixed at a corresponding position around the first duct 303 in a joint manner. The fifth port 55 of the second connecting part 442 corresponds to and fits with the fourth hole 302 of the second heat exchange part 30. The sixth port 56 of the second connecting part 442 corresponds to and fits with the second hole 304 of the second heat exchange part 30. The connecting piece may further include a fixing element 450 for fixing or position limiting. The first connecting part 441 and the second connecting part 442 may have fixing holes 409. The fixing element 450 may be fixed or position limited to the fixing hole 409.

The heat exchange assembly can facilitate the installation and connection of the thermal management system, reduce the number of connected pipes, and reduce the volume of the system. Taking the heat exchange assembly for a vehicle thermal management system as an example, it should be noted that these components are fixed in actual use. For the sake of clarity, the flow of the refrigerant is shown in the exploded view, which is only for clarity and explanation. In a specific vehicle thermal management system, the vehicle thermal management system includes a refrigerant system and a battery thermal management system. Referring to FIG. 30 and other views, the battery thermal management system includes a first port part 101, a second port part 102 of the heat exchange assembly, and a flow passage part in the first heat exchange part that is in communication with the first port and the second port. The heat of the battery can be transferred to the coolant, which flows through part of the passage of the first heat exchange part through the first port 51 or the second port 52, and exchanges heat with the refrigerant of another passage in the first heat exchange part. After being cooled down, the coolant flows back to cool the battery. The third port 53, the fourth port 54, the fifth port 55, and the sixth port 56 are used for the communication of the refrigerant system. For example, the refrigerant cooled by the condenser enters the heat exchange assembly through the third port 53, or the refrigerant flowing through the reservoir enters the heat exchange assembly through the third port 53. In this way, the high-temperature and high-pressure refrigerant passes through the guide hole 202 to the third duct 301 of the second heat exchange part, and flows to the fourth duct 302 after heat exchange with the refrigerant of another flow passage in the second heat exchange part 30. The refrigerant to the fourth duct 302 is divided into two parts: a part of the refrigerant flows out from the fifth port 55 through the second connecting part 442, for example, to flow to the front evaporator or other evaporators through the fifth port 55, and a throttle element may be arranged before the front evaporator. The other part of the refrigerant enters the throttle element 110 through the hole 2081' of the bridging member, the groove 2080 and the inclined hole 2082. After being throttled by the throttle element 110, the refrigerant passes through the hole 2091 to the second duct 104 of the first heat exchange part 10, exchanges heat with the coolant of the coolant passage in the refrigerant flow passage of the first heat exchange part, and flows to the first duct 103. The refrigerant flows out through the hole 2084 of the bridging member, the first duct 303 of the second heat exchange part, and the fourth port communication with the first duct 303, for example to flow back to the compressor; In addition, the sixth port 56 may be used to be in communication with the refrigerant flowing back from the front evaporator or other evaporator. The low-temperature refrigerant flows to the first duct 303 through the second duct 304 of the second heat exchange part, and exchanges heat with the high-temperature refrigerant flowing from the third duct 301 to the fourth duct 302. In the first duct 303, the two parts of the refrigerant can flow back to the compressor through the fourth port after being merged. In this way, part of the low-temperature refrigerant is used to cool the high-temperature refrigerant, which may reduce the condensing temperature of the refrigerant without increasing the temperature of the refrigerant back to the compressor. The flow direction in this specification is only for illustration, not for restriction or as an excluded requirement, and other components can be added therein, such as adding other control valves before the compressor.

Figure 33:
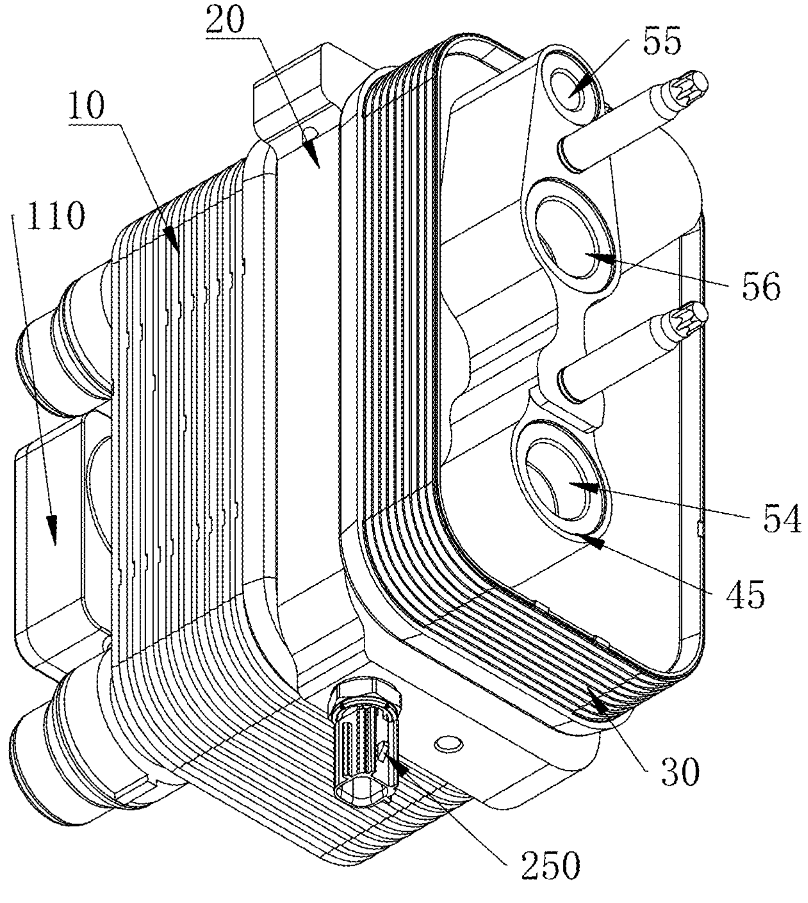
FIG. 33 is a schematic perspective view of the sixth embodiment of the heat exchange assembly.
Figure 34:
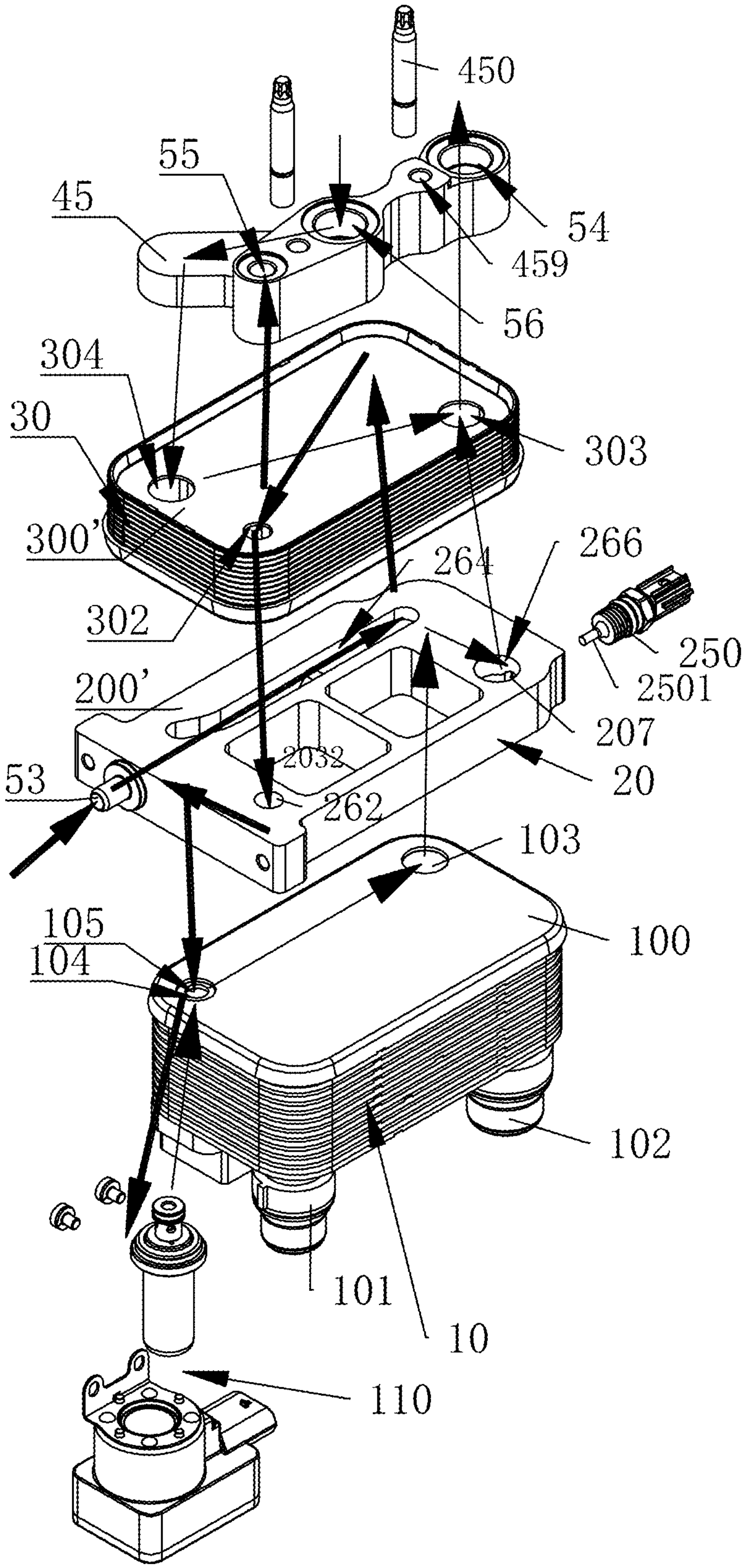
FIG. 34 is an exploded schematic diagram of the heat exchange assembly shown in FIG. 33.
Figure 35:
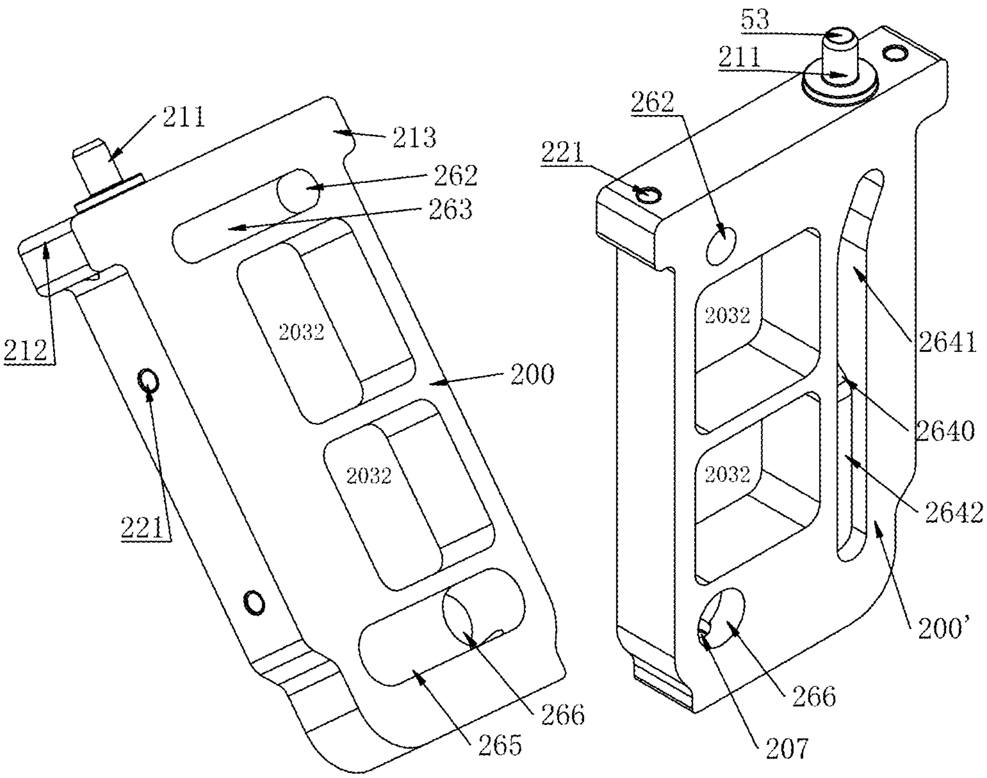
FIG. 35 is a perspective view of the bridging member of the heat exchange assembly shown in FIG. 33 in two directions.
Figure 36:
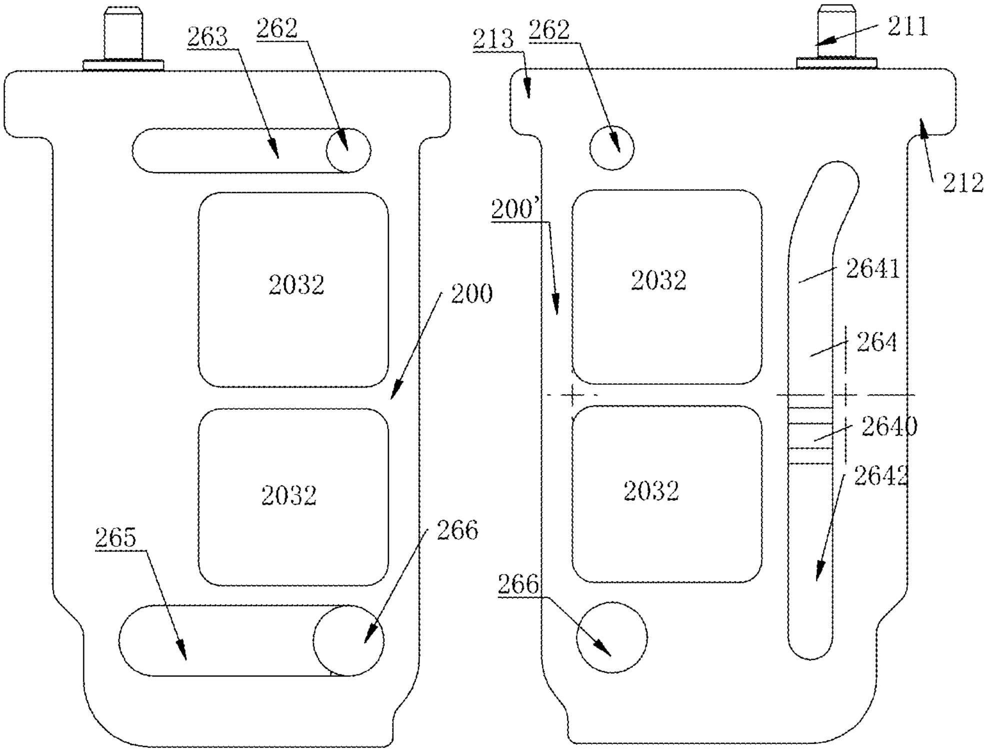
FIG. 36 is a schematic diagram of a front view and a rear view of the bridging member shown in FIG. 35.
Figure 37:
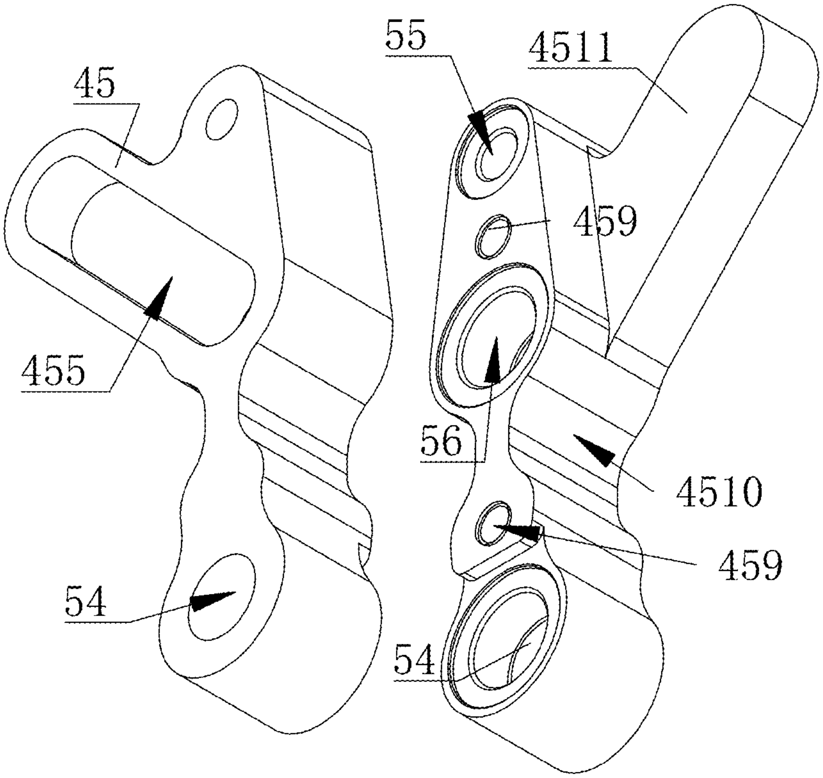
FIG. 37 is a perspective view of the connecting piece of the heat exchange assembly shown in FIG. 33 in two directions.

The heat exchange assembly may also be shown in FIG. 33 to FIG. 37, FIG. 33 is a schematic perspective view of the sixth embodiment of the heat exchange assembly, FIG. 34 is an exploded schematic diagram of the heat exchange assembly, FIG. 35 is a schematic perspective view of the bridging member of the heat exchange assembly in two directions, FIG. 36 is a schematic diagram of a front view and a rear view of the bridging member shown in FIG. 35, FIG. 37 is a perspective view of the connecting piece of the heat exchange assembly shown in FIG. 33 in two directions. The heat exchange assembly includes a first heat exchange part 10, a throttle element 110, a bridging member 20, a second heat exchange part 30, and a connecting piece 45. Most of the bridging member 20 is located between the first heat exchange part 10 and the second heat exchange part 30, the connecting piece 45 is located on the other side of the second heat exchange part 30. That is, the bridging member 20 and the connecting piece 45 are arranged on both sides of the second heat exchange part, respectively. The first heat exchange part 10, the bridging member 20 and the second heat exchange part 30 are fixed by welding, or the first heat exchange part 10, the bridging member 20, the second heat exchange part 30 and the connecting piece are fixed by welding.

The first heat exchange part 10 has a heat exchange core body, the first heat exchange part 10 has two flow passages through which fluid flows for heat exchange, and the two fluid flow passages are separated from each other. The first heat exchange part 10 includes interlayer flow passages separated by stacks of plates. At least two fluids may flow through the first heat exchange part 10, the two fluids may exchange heat in the first heat exchange part, for example, one fluid is a refrigerant, and the other fluid may be a coolant for cooling heating elements such as batteries; in addition, the heat exchange part may also be used for three fluids. For example, one fluid is refrigerant, the other two fluids may be coolant. The two coolants may be controlled and selected to exchange heat with the refrigerant, and then the coolant may be used to cool the components that need to be cooled after heat exchange and temperature reduction. Specifically, two fluids are used as examples to illustrate.

The heat exchange assembly has a first port 51, a second port 52, a third port 53, a fourth port 54, a fifth port 55 and a sixth port 56. The first heat exchange part is provided with a first port part 101 and a second port part 102. The bridging member 20 is provided with a third port part 211. The connecting piece 45 is provided with the fourth port 54, the fifth port 55 and the sixth port 56. The throttle element 110 and the first heat exchange part 10 are fixedly arranged or position-limitedly arranged. The first heat exchange part 10 has four ducts such as a first duct 103 and a second duct 104 (not all shown in the figure). The first heat exchange part is further provided with a pipe having a communication port 105 in the second duct 104. The second duct 104 is not communicated at the side close to the bridging member, and the communication port 105 is in communication with the inlet of the throttle element 110. The first port part 101 of the first heat exchange part 10 has the first port 51 in communication with the coolant. The second port part 102 has the second port 52 in communication with the coolant. The first port 51 is in communication with the second port 52 through the flow passage of the heat exchange core body. The first port part 101 and the second port part 102 may be a part of the side plate of the first heat exchange part, or the two port parts may be processed separately and fixed to the side plate and/or the heat exchange core body of the first heat exchange part by welding.

The bridging member 20 has a first matching part 200 and a second matching part 200'. Accordingly, the first heat exchange part 10 has a matching part 100, and the matching part 100 is correspondingly matched with the first matching part 200 of the bridging member. The second heat exchange part 30 has a matching part 300, and the matching part 300 is correspondingly matched with the second matching part 200' of the bridging member; the matching part 100 of the first heat exchange part 10, the matching part 300 of the second heat exchange part 30, and the two matching parts of the bridging member all include flat parts. The hole or groove for communication or the opening of the guide part of the bridging member for communication provided on the side of the first matching part 200 are all located inside the first matching part. In addition, the periphery of each communication opening is surrounded by the first matching part. The first heat exchange part has a corresponding communication opening at a position corresponding to each opening of the bridging member for communication. Each communication opening of the first heat exchange part is located inside the matching part thereof, and each communication opening is surrounded by the matching part. In this way, after the matching part 100 of the first heat exchange part 10 and the first matching part 200 of the bridging member are welded and sealed, the communication opening of the bridging member can be in communication with the communication opening corresponding to the first heat exchange part. In other words, the periphery of each communication opening includes a part of the matching part. The two communication openings form a substantially closed structure at the matching parts that are opposite arranged. The matching part 300 of the second heat exchange part 30 corresponds to the position of the second matching part 200' of the bridging member. After the second heat exchange part is welded and sealed with the bridging member, the communication openings of the bridging member on this side are all in communication with the communication openings of the second heat exchange part. Specifically, the second heat exchange part 30 has the openings of three ducts on the side opposite to the bridging member 20: the openings of the third duct 301, the fourth duct 302, and the first duct 303, the bridging member 20 has the opening of the guide groove 264, the opening of the hole 262 and the opening of the hole 266 on the side opposite to the second heat exchange part 30, that is, in the second matching part. The diameter of the hole 266 is greater than or equal to the diameter of the hole 262. The opening of the third duct 301 of the second heat exchange part corresponds to a part of the opening of the guide groove 264. The opening of the fourth duct 302 corresponds to the position of the opening of the hole 262. The opening of the first duct 303 corresponds to the position of the opening of the hole 266. The guide groove 264 includes a first part 2641, a second part 2642 and a transition part 2640. The first part 2641 is relatively close to the third port part, and the second part 2642 is relatively far away from the third port part; the transition part 2640 is located between the first part 2641 and the second part 2642. The depth of the first part 2641 is greater than the depth of the second part 2642. The depth of the first part 2641 close to the third port part is greater than or equal to half the thickness of the bridging member or close to half the thickness of the bridging member. For example, the depth of the first part 2641 close to the third port part is greater than or equal to one-third of the thickness of the bridging member and less than two-thirds of the thickness of the bridging member. The first part 2641 is in communication with the third port. The first heat exchange part 10 has the opening of the first duct 103 and the communication port 105 in communication with the throttle element on the side opposite to the bridging member 20. The bridging member 20 has corresponding third grooves 263 and fourth grooves 265 on the side opposite to the first heat exchange part 10. The third groove 263 is in communication with the smaller hole 262, the fourth groove 265 is in communication with the larger hole 266. Part of the opening of the fourth groove 265 corresponds to the position of the opening of the first duct 103 of the first heat exchange part. The opening of the third groove 263 is in communication with the communication port 105 of the throttle element. The projection of one of the guide groove 264 and the third port 53 on the front side is at least partially located in the third groove 263, the projection of the guide groove 264 on the front side is at least partially located in the fourth groove 265. The guide groove 264 is at least partially back to the fourth groove 265 and is not in direct communication with the fourth groove 265. The first, second, third, fourth and other serial numbers here are only for distinguishing and explaining, and do not specify the number of grooves or holes.

The bridging member 20 includes a third port part 211, and the third port part 211 has a third port 53. The third port part 211 includes an outwardly protruding structure. The third port part 211 may be a structure integrated with the main body of the bridging member, or may be a structure that is processed separately and fixed to the main body of the bridging member by welding. The bridging member 20 is further provided with two weight-reducing holes 2032. The first part 2641 of the guide groove 264 is close to the third port part. The second part 2642 of the guide groove 264 is relatively far away from the third port part. The guide groove 264 is generally extended along the length direction; the third port 53 is in communication with the first part 2641 of the guide groove 264. The depth of the second part 2642 of the guide groove 264 is less than half of the thickness of the bridging member, even not greater than 0.4 times the thickness of the bridging member; the depths of the fourth groove 265 and the third groove 263 are both less than half the thickness of the bridging member, both the depth of the fourth groove 265 and the third groove 263 are not greater than 0.4 times the thickness of the bridging member, In this way, grooves may be provided on both sides of the bridging member to form relatively independent flow passages with the two heat exchange parts, and the size of the entire assembly can be reduced. The thickness of the bridging member herein refers to the thickness of the two matching parts of the bridging member. The bridging member 20 is further provided with two shoulders 212, 213. At least part of the shoulders 212, 213 protrude from the body part, the bridging member 20 is provided with a fixing hole 221, and the fixing hole is provided at least one shoulder or near the shoulder.

The weight-reducing hole 2032 in this specification is to reduce the weight and make the bridging member be suitable for welding with the first heat exchange part and the second heat exchange part. The hole 2032 penetrates from the side close to the first heat exchange part to the side close to the second heat exchange part of the bridging member. The hole 2032 is not in communication with the passage of the first heat exchange part. The hole 2032 is not in communication with the passage of the second heat exchange part. The hole 2032 is not in communication with the hole or groove that the bridging member uses for communication; the distance between the hole 2032 and the hole, which is used for communication, of the bridging member facing or close to the first heat exchange part is greater than or equal to 1.5 mm, the distance between the hole 2032 and the groove, which is used for communication, of the bridging member facing or close to the first heat exchange part is greater than or equal to 1.5 mm; the distance between the hole 2032 and the hole, which is used for communication, of the bridging member facing or close to the second heat exchange part is greater than or equal to 1.5 mm, the distance between the hole 2032 and the groove, which is used for communication, of the bridging member facing or close to the second heat exchange part is greater than or equal to 1.5 mm. However, the weight-reducing holes have not to be through holes. For example, the two sides of the bridging member are concave inward to form blind holes or grooves on both sides, which may reduce weight and facilitate welding, but through holes are more suitable for processing. The connecting piece 45 includes a main body part 4510 and an extension part 4511. The connecting piece 40 is provided with a fourth port 54, a fifth port 55 and a sixth port 56, and is further provided with a fixing hole 459 for matching, fixing or position limiting. The connecting piece 45 has a groove 455 on the side facing the second heat exchange part 30, and the groove 455 has a blind hole-like structure. The groove 455 extends from the extending portion to the position where the sixth port 56 is located, and the groove 455 in communication with the sixth port 56. The connecting piece may further include a fixing element 450 for fixing or position limiting. The fixing element 450 may be fixed or position limited to the fixing hole 409. The second heat exchange part has a fourth duct 302, a first duct 303, and a second duct 304 toward the connecting piece 40. The fourth port 54 of the connecting piece 40 corresponds to the first duct 303. The fifth port 55 corresponds to the fourth duct 302. The sixth port 56 is in communication with the second duct 304 through the groove 455.

The heat exchange assembly can facilitate the installation and connection of the thermal management system, reduce the number of connected pipes, and reduce the volume of the system. Taking the heat exchange assembly for a vehicle thermal management system as an example, it should be noted that these components are relatively fixed in actual use. For the sake of clarity, the flow of the refrigerant is shown in the exploded view, which is only for clarity and explanation. In a specific vehicle thermal management system, the vehicle thermal management system includes a refrigerant system and a battery thermal management system. Referring to FIG. 34 and other views, the battery thermal management system includes a first port part 101, a second port part 102 of the heat exchange assembly, and a flow passage part in the first heat exchange part that is in communication with the first port and the second port. The heat of the battery can be transferred to the coolant, which flows to part of the passage of the first heat exchange part through the first port 51 or the second port 52, and exchanges heat with the refrigerant of another flow passage in the first heat exchange part. After being cooled down, the coolant flows back to cool the battery. The third port 53, the fourth port 54, the fifth port 55 and the sixth port 56 are used to in communication with the refrigerant system. For example, the refrigerant cooled by the condenser enters the heat exchange assembly through the third port 53, or the refrigerant flowing through the reservoir enters the heat exchange assembly through the third port 53. In this way, the high-temperature and high-pressure refrigerant flows to the third duct 301 of the second heat exchange part through the flow passage formed by the space where the guide groove 264 is located and by cooperation of the bridging member and the second heat exchange part. After heat exchange with the refrigerant of another flow passage in the second heat exchange part 30, the high-temperature and high-pressure refrigerant passes to the fourth duct 302. The refrigerant to the fourth duct 302 is divided into two parts: a part of the refrigerant flows out through the connecting piece 45 and the fifth port 55, for example, flows to the front evaporator or other evaporators through the fifth port 55, and a throttle element may be provided before the evaporator, or the refrigerant is diverted to two evaporators after throttling, or diverted and throttled to the evaporators, etc. The other part of the refrigerant enters the throttle element 110 through the hole 262 of the bridging member, the flow passage formed by the space where the third groove 263 is located and by the cooperation of the bridging member and the first heat exchange part, and the communication port 105 in communication with the throttle element. After being throttled by the throttle element 110, the refrigerant enters the second duct 104 of the first heat exchange part 10, exchanges heat with the coolant in the coolant passage of the first heat exchange part, and flows to the first duct 103, and then the refrigerant passes through the flow passage formed by the bridging member and the matching part of the first heat exchange part, through the hole 266, to the first duct 303 of the second heat exchange part, and flows out through the fourth port corresponding to the first duct 303, for example flow back to the compressor; and the flow passage is formed in the space where the fourth groove 265 is located. In addition, the sixth port 56 may be used to communicate the refrigerant flowing back from the front evaporator and/or other evaporator. This part of the low-temperature refrigerant flows to the second duct 304 of the second heat exchange part through the flow passage formed by the space where the groove 455 is located and by cooperation of the connecting piece 45 and the second heat exchange part, and then the refrigerant flows to the first duct 303, and exchanges heat with the high-temperature refrigerant flowing from the third duct 301 to the fourth duct 302. In the first duct 303, the two parts of the refrigerant may flow back to the compressor through the fourth port 54 after being merged. In this way, part of the low-temperature refrigerant is used to cool the high-temperature refrigerant, which may reduce the condensing temperature of the refrigerant without increasing the temperature of the refrigerant back to the compressor. A second mounting part 207 is further provided on the bridging member 20 for mounting the sensing element 250, such as a temperature sensing element. The sensor head 2501 for temperature sensing passes through the mounting part and is located in the flow passage where the hole 266 and/or the fourth groove 265 are located. In this way, the temperature of the refrigerant after passing through the first heat exchange part or the outlet temperature of the evaporator can be obtained. The second heat exchange part may realize heat exchange between high-temperature refrigerant and part of low-temperature refrigerant, reduce the temperature of the high-temperature refrigerant, and prevent the temperature of the refrigerant back to the compressor from being too high, thereby improving the efficiency.

The heat exchange assembly includes a first heat exchange part, a bridging member, and a second heat exchange part. The bridging member is at least partially located between the first heat exchange part and the second heat exchange part, and the fluid communication between the two heat exchange parts can be relatively conveniently realized by the bridging member. Different system requirements can be realized by changing the structure of the bridging member, so that the systematical pipeline is simple, the pipeline settings between ports can be reduced, and the system connection is simple and convenient. The refrigerant flow passage of the first heat exchange part of the assembly may be a single flow path, that is, flow from the second duct 104 to the first duct 103, or may be a three-flow path, that is, the first heat exchange part is substantially divided into three parts horizontally. The first flow path is from the lowermost part of the second duct 104 to the lowermost part of the first duct 103, the second flow path is from the middle part of the first duct 103 to the middle part of the second duct 104, the third flow path is from the upper part of the second duct 104 to the upper part of the first duct 103. Therefore, only the refrigerant flowing out of the first duct 103 is described in the embodiment. Unless otherwise specified, the thickness of the bridging member refers to the thickness between the flat parts of the two matching parts of the bridging member. The flow direction in this specification is only for illustration, not for restriction or as an excluded requirement, and other components can be added therein, such as adding other control valves before the compressor. For example, the flow path leading to the evaporator includes a throttle element before the evaporator, and even has a control valve, etc.; herein, the second duct 104 of the first heat exchange part is in communication with the outlet of the throttle element 110, but there may not be an opening in case of facing the bridging member, and the figure is only to illustrate the location of the passage. These technical solutions may be modified according to the actual system, the connection situation is subject to the specific technical solution. For example, if the first port is in communication with the second port, it does not exclude the case that the first port is also connected with other ports at the same time.

It should be noted that the above embodiments are only used to illustrate the present application, and not to limit the technical solution described according to the present application, such as the definition of directionality such as “front”, “rear”, “left”, “right”, “up” and “down”. This specification has described the present application in detail with reference to the above embodiments, however, those skilled in the art should understand that they can still modify or equivalently replace the present application, and all technical solutions and improvements that do not depart from the spirit and scope of the present application should be covered within the scope claimed by the claims of the present application.

The invention claimed is:

1. A heat exchange assembly, comprising a first heat exchange part, a bridging member, a second heat exchange part and a connecting piece, wherein the bridging member is at least partially located between the first heat exchange part and the second heat exchange part, wherein the first heat exchange part, the bridging member and the second heat exchange part are fixed by welding; wherein the second heat exchange part is at least partially located between the bridging member and the connecting piece; wherein the first heat exchange part has a heat exchange core body, wherein the first heat exchange part comprises two fluid flow passages, which are not in communication with each other;

wherein the heat exchange assembly comprises at least six ports: a first port, a second port, a third port, a fourth port, a fifth port and a sixth port, wherein the connecting piece has the fourth port, the fifth port and the sixth port; wherein the second heat exchange part comprises four ducts: a first duct, a second duct, a third duct and a fourth duct; wherein the fourth port is in communication with the first duct of the second heat exchange part, and the fifth port is in communication with the fourth duct of the second heat exchange part; wherein the sixth port is in communication with the fourth port through the second heat exchange part, or the sixth port is in communication with the fourth port through a flow passage; wherein the first heat exchange part comprises two ducts: the first duct and the second duct, wherein the first duct of the first heat exchange part is in communication with the first duct of the second heat exchange part through the bridging member; wherein the bridging member comprises two holes and/or grooves directly adjacent to the first heat exchange part for communication, wherein the bridging member comprises at least two holes and/or grooves in communication with the second heat exchange part, wherein the openings of the holes and/or grooves of the bridging member in communication with the second heat exchange part are directly adjacent to the second heat exchange part, wherein the third port, the fourth port, the fifth port and the sixth port are configured such that a first fluid flows into the heat exchange assembly through the third port and the sixth port and flows out of the heat exchange assembly through the fourth port and the fifth port, respectively.

2. The heat exchange assembly according to claim 1, wherein the connecting piece is fixedly connected to the second heat exchange part, wherein the sixth port is in communication with the second duct of the second heat exchange part, wherein the first duct of the second heat exchange part is in communication with the second duct of the second heat exchange part; wherein the connecting piece comprises a main body part and an extension part, wherein the main body part is provided with at least three ports of the heat exchange assembly; wherein the connecting piece has grooves on a side facing the second heat exchange part, wherein the grooves are in communication with one duct of the second heat exchange part and at least one of the ports; wherein the grooves are partially located in the main body part and partially located in the extension part.

3. The heat exchange assembly according to claim 1, wherein the connecting piece comprises a connecting block, a connecting plate, and two or three connecting pipe matching parts, wherein the connecting block, the connecting plate, and the connecting pipe matching parts are fixed by welding, wherein the connecting piece, the second heat exchange part, the bridging member, and the first heat exchange part are fixed by welding; wherein a thickness of the connecting block is greater than a thickness of the connecting plate, wherein each of the connecting pipe matching parts is provided with at least one port; wherein the connecting plate is provided with at least four through holes, wherein the connecting block is provided with at least three through holes, wherein each port of the connecting pipe matching part is in communication with one of the through holes of the connecting plate, wherein each through hole of the connecting plate is in communication with one through hole of the connecting block, wherein at least one through hole of the connecting block is in communication with the two through holes of the connecting plate, wherein each through hole of the connecting block is in communication with at least one through hole of the connecting plate; wherein the connecting block comprises at least two through holes, which are in communication with the ducts of the second heat exchange part, respectively.

4. The heat exchange assembly according to claim 1, wherein the heat exchange assembly further comprises a seventh port, wherein the seventh port is arranged on the connecting piece, and is in communication with the fourth duct of the second heat exchange part; wherein the heat exchange assembly comprises a first port part and a second port part, wherein the first port part is provided with the first port, the second port part is provided with the second port, wherein the first heat exchange part comprises the first port part and the second port part, or the first heat exchange part is fixedly arranged with the first port part and the second port part; wherein the heat exchange assembly further comprises a third port part, wherein the third port part is provided with the third port, wherein the bridging member comprises the third port part or the connecting piece comprises the third port part.

5. The heat exchange assembly according to claim 1, wherein the heat exchange assembly further comprises a seventh port and an eighth port arranged on the connecting piece, wherein the seventh port is in communication with the fourth duct of the second heat exchange part; wherein the eighth port is in communication with the fourth port through the second heat exchange part, or the eighth port is in communication with the fourth port through the flow passage; wherein the heat exchange assembly comprises a first port part and a second port part, wherein the first port part is provided with the first port, the second port part is provided with the second port, wherein the first heat exchange part comprises the first port part and the second port part, or the first heat exchange part is fixedly arranged with the first port part and the second port part; wherein the heat exchange assembly further comprises a third port part, which is provided with the third port, wherein the bridging member comprises the third port part or the connecting piece comprises the third port part.

6. The heat exchange assembly according to claim 4, wherein the bridging member comprises a mounting part, wherein a throttle element and the bridging member are fixedly arranged or position-limiting arranged, wherein the throttle element is fixedly or position-limiting mounted to the mounting part; wherein a port of the throttle element is in communication with the second duct of the first heat exchange part.

7. The heat exchange assembly according to claim 6, wherein the two holes and/or grooves of the bridging member in communication with the first heat exchange part comprise a hole, wherein the hole is located in the mounting part and is in communication with an outlet of the throttle element, wherein the outlet of the throttle element is in communication with the second duct of the first heat exchange part through the hole, wherein the other hole and/or groove of the bridging member in communication with the first heat exchange part is in communication with the first duct of the first heat exchange part; wherein one of the two holes and/or grooves of the bridging member in communication with the second heat exchange part is in communication with the first duct of the second heat exchange part, wherein the other hole and/or groove in communication with the second heat exchange part communicates the inlet of the throttle element with the fourth duct of the second heat exchange part.

8. The heat exchange assembly according to claim 6, wherein an area of the second heat exchange part is not larger than an area of the first heat exchange part, wherein at least part of the mounting part protrudes from the second heat exchange part; wherein the bridging member correspondingly has a hole for circulation, wherein the hole corresponds to or is in communication with the position of the first duct of the first heat exchange part, wherein the hole corresponds to or is in communication with the position of the first duct of the second heat exchange part; wherein one groove of the holes and/or grooves of the bridging member is provided on a side opposite to the first heat exchange part, wherein the bridging member comprises through holes; wherein one side of the groove is provided with the holes, or one side of the groove is in communication with the holes; wherein an inclined hole is further provided on the other side of the groove, wherein the inclined hole communicates the hole of the mounting part and the groove, wherein the inlet of the throttle element is in communication with the second duct of the second heat exchange part through the inclined hole, the groove and the holes.

9. The heat exchange assembly according to claim 1, wherein the bridging member has a first matching part and a second matching part, wherein the first heat exchange part has a matching part, wherein the matching part of the first heat exchange part is correspondingly matched with the first matching part of the bridging member; wherein the second heat exchange part has a matching part, wherein the matching part of the second heat exchange part is correspondingly matched with the second matching part of the bridging member; wherein the matching part of the first heat exchange part, the matching part of the second heat exchange part, and the two matching parts of the bridging member comprise flat parts; wherein the opening of the hole or groove for communication of the bridging member facing or close to the first heat exchange part is located inside the first matching part; wherein the opening, which is close to the second matching part, of the hole or groove of the bridging member that is able to be in communication with the second matching part is located inside the second matching part.

10. The heat exchange assembly according to claim 1, wherein the bridging member further comprises at least a weight-reducing hole; wherein the weight-reducing hole is not in communication with the ducts of the first heat exchange part and the ducts of the second heat exchange part, wherein the weight-reducing hole is not in communication with the hole or groove of the bridging member for communication; wherein the distance between the weight-reducing hole and the hole or groove for communication of the bridging member, which faces or is close to the first heat exchange part, is greater than or equal to 1.5 mm; wherein the distance between the weight-reducing hole and the hole or groove for communication of the bridging member, which faces or is close to the second heat exchange part, is greater than or equal to 1.5 mm.

11. A vehicle thermal management system, comprising a refrigerant flow passage and a coolant flow passage, wherein the vehicle thermal management system comprises the heat exchange assembly according to claim 1; wherein the vehicle thermal management system comprises a compressor, a condenser and at least one evaporator, wherein the coolant flow passage flows through the first port part, the second port part and the flow passage part of the first heat exchange part in communication with the first port and the second port; wherein the condenser is connected with the third port part through a pipeline or through a pipeline and a liquid reservoir, wherein the inlet of the compressor is in communication with the fourth port, wherein the inlet of the evaporator is in communication with the fifth port, or the vehicle thermal management system further comprises a throttle element between the inlet of the evaporator and the fifth port, wherein the outlet of the evaporator is in communication with the sixth port.

12. The vehicle thermal management system according to claim 11, comprising a front evaporator and a rear evaporator, wherein the heat exchange assembly further comprises a seventh port, wherein the inlet of one of the front evaporator or the rear evaporator is in communication with the fifth port, or the vehicle thermal management system is provided with the throttle element between the inlet of one of the front evaporator or the rear evaporator and the fifth port, and the inlet of the other evaporator is in communication with the seventh port, or the vehicle thermal management system is provided with a throttle element between the inlet of the other one of the front evaporator and the rear evaporator and the seventh port, wherein the outlet of the front evaporator and/or the rear evaporator is in communication with the sixth port.

13. The vehicle thermal management system according to claim 11, comprising a front evaporator and a rear evaporator, wherein the heat exchange assembly further comprises a seventh port and an eighth port, wherein the inlet of one of the front evaporator or the rear evaporator is in communication with the fifth port, or the vehicle thermal management system is provided with the throttle element between the inlet of one of the front evaporator or the rear evaporator and the fifth port, and the inlet of the other evaporator is in communication with the seventh port, or the vehicle thermal management system is provided with a throttle element between the inlet of the other one of the front evaporator and the rear evaporator and the seventh port, wherein the outlet of one of the front evaporator or the rear evaporator is in communication with the sixth port, and the other one of the front evaporator or the rear evaporator is in communication with the eighth port.

14. The heat exchange assembly according to claim 3, wherein the heat exchange assembly further comprises a seventh port, wherein the seventh port is arranged on the connecting piece, and is in communication with the fourth duct of the second heat exchange part; wherein the heat exchange assembly comprises a first port part and a second port part, wherein the first port part is provided with the first port, the second port part is provided with the second port, wherein the first heat exchange part comprises the first port part and the second port part, or the first heat exchange part is fixedly arranged with the first port part and the second port part; wherein the heat exchange assembly further comprises a third port part, wherein the third port part is provided with the third port, wherein the bridging member comprises the third port part or the connecting piece comprises the third port part.

15. The heat exchange assembly according to claim 3, wherein the heat exchange assembly further comprises a seventh port and an eighth port arranged on the connecting piece, wherein the seventh port is in communication with the fourth duct of the second heat exchange part; wherein the eighth port is in communication with the fourth port through the second heat exchange part, or the eighth port is in communication with the fourth port through the flow passage; wherein the heat exchange assembly comprises a first port part and a second port part, wherein the first port part is provided with the first port, the second port part is provided with the second port, wherein the first heat exchange part comprises the first port part and the second port part, or the first heat exchange part is fixedly arranged with the first port part and the second port part; wherein the heat exchange assembly further comprises a third port part, which is provided with the third port, wherein the bridging member comprises the third port part or the connecting piece comprises the third port part.

16. The heat exchange assembly according to claim 5, wherein the bridging member comprises a mounting part, wherein the throttle element and the bridging member are fixedly arranged or position-limiting arranged, wherein the throttle element is fixed or position limited to the mounting part; wherein a port of the throttle element is in communication with the second duct of the first heat exchange part.

17. The heat exchange assembly according to claim 16, wherein the two holes and/or grooves of the bridging member in communication with the first heat exchange part comprise a hole, wherein the hole is located in the mounting part and is in communication with an outlet of the throttle element, wherein the outlet of the throttle element is in communication with the second duct of the first heat exchange part through the hole, wherein the other hole and/or groove of the bridging member in communication with the first heat exchange part is in communication with the first duct of the first heat exchange part; wherein one of the two holes and/or grooves of the bridging member in communication with the second heat exchange part is in communication with the first duct of the second heat exchange part, wherein the other hole and/or groove in communication with the second heat exchange part communicates the inlet of the throttle element with the fourth duct of the second heat exchange part.

18. The heat exchange assembly according to claim 16, wherein an area of the second heat exchange part is not larger than an area of the first heat exchange part, wherein at least part of the mounting part protrudes from the second heat exchange part; wherein the bridging member correspondingly has a hole for circulation, wherein the hole corresponds to or is in communication with the position of the first duct of the first heat exchange part, wherein the hole corresponds to or is in communication with the position of the first duct of the second heat exchange part; wherein one groove of the holes and/or grooves of the bridging member is provided on a side opposite to the first heat exchange part, wherein the bridging member comprises through holes; wherein one side of the groove is provided with the holes, or one side of the groove is in communication with the holes; wherein an inclined hole is further provided on the other side of the groove, wherein the inclined hole communicates the hole of the mounting part and the groove, wherein the inlet of the throttle element is in communication with the second duct of the second heat exchange part through the inclined hole, the groove and the holes.

19. The vehicle thermal management system according to claim 11, wherein the connecting piece is fixedly connected to the second heat exchange part, wherein the sixth port is in communication with the second duct of the second heat exchange part, wherein the first duct of the second heat exchange part is in communication with the second duct of the second heat exchange part; wherein the connecting piece comprises a main body part and an extension part, wherein the main body part is provided with at least three ports of the heat exchange assembly; wherein the connecting piece has grooves on a side facing the second heat exchange part, wherein the grooves is in communication with one duct of the second heat exchange part and at least one of the ports; wherein the grooves are partially located in the main body part and partially located in the extension part.

20. The vehicle thermal management system according to claim 11, wherein the connecting piece comprises a connecting block, a connecting plate, and two or three connecting pipe matching parts, wherein the connecting block, the connecting plate, and the connecting pipe matching parts are fixed by welding, wherein the connecting piece, the second heat exchange part, the bridging member, and the first heat exchange part are fixed by welding; wherein a thickness of the connecting block is greater than a thickness of the connecting plate, wherein each of the connecting pipe matching parts is provided with at least one port; wherein the connecting plate is provided with at least four through holes, wherein the connecting block is provided with at least three through holes, wherein each port of the connecting pipe matching part is in communication with one of the through holes of the connecting plate, wherein each through hole of the connecting plate is in communication with one through hole of the connecting block, wherein at least one through hole of the connecting block is in communication with the two through holes of the connecting plate, wherein each through hole of the connecting block is in communication with at least one through hole of the connecting plate; wherein the connecting block comprises at least two through holes, which are in communication with the ducts of the second heat exchange part, respectively.

* * * * *